(12) United States Patent
Crockett

(10) Patent No.: US 10,440,492 B2
(45) Date of Patent: Oct. 8, 2019

(54) CALIBRATION OF VIRTUAL HEIGHT SPEAKERS USING PROGRAMMABLE PORTABLE DEVICES

(71) Applicant: DOLBY LABORATORIES LICENSING CORPORATION, San Francisco, CA (US)

(72) Inventor: Brett G. Crockett, Brisbane, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 74 days.

(21) Appl. No.: 15/110,070

(22) PCT Filed: Jan. 6, 2015

(86) PCT No.: PCT/US2015/010294
§ 371 (c)(1),
(2) Date: Jul. 6, 2016

(87) PCT Pub. No.: WO2015/105788
PCT Pub. Date: Jul. 16, 2015

(65) Prior Publication Data
US 2016/0330562 A1 Nov. 10, 2016

Related U.S. Application Data

(60) Provisional application No. 61/926,104, filed on Jan. 10, 2014.

(51) Int. Cl.
| | |
|---|---|
| *H04S 7/00* | (2006.01) |
| *G06F 3/16* | (2006.01) |
| *H04R 5/02* | (2006.01) |

(52) U.S. Cl.
CPC .............. *H04S 7/301* (2013.01); *G06F 3/162* (2013.01); *H04R 5/02* (2013.01); *H04S 7/307* (2013.01); *H04R 2430/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,306,113 | A | * 12/1981 | Morton | H03G 5/165 |
| | | | | 333/28 T |
| 5,199,075 | A | 3/1993 | Fosgate | |
| 5,943,430 | A | * 8/1999 | Saitoh | H04N 5/642 |
| | | | | 181/155 |

(Continued)

FOREIGN PATENT DOCUMENTS

| | | |
|---|---|---|
| DE | 2941692 | 4/1981 |
| JP | 2010-258653 | 11/2010 |

(Continued)

*Primary Examiner* — Duc Nguyen
*Assistant Examiner* — Assad Mohammed

(57) ABSTRACT

At least part of a speaker calibration process, such as a process of adjusting the gain of a top-firing speaker of a virtual height speaker system to compensate for ceiling height and/or ceiling acoustic reflectivity, may be done using a mobile device (a smart phone, a tablet, etc.) running a mobile device application on a mobile operating system (iOS, Android, etc.). An un-calibrated or minimally calibrated microphone, of the type typically found in mobile devices such as smart phones and tablets, may be used to provide input for such speaker calibration processes.

24 Claims, 19 Drawing Sheets

(56) References Cited

U.S. PATENT DOCUMENTS

| | | |
|---|---|---|
| 7,606,377 B2 | 10/2009 | Melanson |
| 8,307,388 B2 | 11/2012 | Igoe |
| 8,428,268 B2 | 4/2013 | Konagai |
| 2002/0136414 A1* | 9/2002 | Jordan ............... H04S 3/00 381/58 |
| 2006/0067536 A1* | 3/2006 | Culbert ............ H04S 1/007 381/58 |
| 2007/0263888 A1* | 11/2007 | Melanson ........... H04S 3/00 381/300 |
| 2008/0226087 A1* | 9/2008 | Kinghorn ........ H04S 7/301 381/59 |
| 2010/0272270 A1 | 10/2010 | Chaikin |
| 2012/0014544 A1* | 1/2012 | Gladwin ............ H04R 3/12 381/304 |
| 2012/0113224 A1 | 5/2012 | Nguyen |
| 2012/0140960 A1 | 6/2012 | Jang |
| 2012/0288124 A1 | 11/2012 | Fejzo |
| 2012/0328135 A1 | 12/2012 | De Bruijn |
| 2013/0022221 A1 | 1/2013 | Kallai |
| 2013/0066453 A1 | 3/2013 | Seefeldt |
| 2013/0216071 A1* | 8/2013 | Maher ............... H04R 3/04 381/303 |

FOREIGN PATENT DOCUMENTS

| | | |
|---|---|---|
| WO | 2011/161567 | 12/2011 |
| WO | 2013/014595 | 1/2013 |

* cited by examiner

CALIBRATION OF VIRTUAL HEIGHT SPEAKERS USING PROGRAMMABLE PORTABLE DEVICES

CROSS REFERENCE TO RELATED APPLICATIONS

This application claims priority to U.S. Provisional Patent Application No. 61/926,104, filed on 10 Jan. 2014, which is hereby incorporated by reference in its entirety.

TECHNICAL FIELD

This disclosure relates to speaker calibration.

BACKGROUND

Current spatial audio systems have generally been developed for cinema use, and thus involve deployment in large rooms and the use of relatively expensive equipment, including arrays of multiple speakers distributed around a theater. An increasing amount of advanced audio content, however, is being made available for playback in the home environment through streaming technology and advanced media technology, such as Blu-ray disks, and so on. In addition, emerging technologies such as 3D television and advanced computer games and simulators are encouraging the use of relatively sophisticated equipment, such as large-screen monitors, surround-sound receivers and speaker arrays in home and other listening environments. In spite of the availability of such content, equipment cost, installation complexity, and room size remain realistic constraints that prevent the full exploitation of spatial audio in most home environments. For example, advanced object-based audio systems typically employ overhead or height speakers to playback sound that is intended to originate above a listener's head. In many cases, and especially in the home environment, such height speakers may not be available. In this case, the height information is lost if such sound objects are played only through floor or wall-mounted speakers.

SUMMARY

Improved methods for speaker calibration are provided. Some such methods may involve receiving an indication to initiate a speaker calibration process and determining a desired acoustic power ratio between a top-firing speaker and a front-firing speaker. Such methods may involve providing a first user prompt indicating that a user should position a mobile device in a first location. The first user prompt may, for example, be made via a display and/or a speaker of the mobile device. Some methods may involve sending (for example, via a wireless interface of the mobile device) at least one signal indicating that the top-firing speaker should reproduce top-firing speaker acoustic test signals and that the front-firing speaker should reproduce front-firing speaker acoustic test signals. Some methods may involve receiving (for example, from a microphone of the mobile device) first electrical signals corresponding to first measured acoustic power of reproduced top-firing speaker acoustic test signals and first measured acoustic power of reproduced front-firing speaker acoustic test signals.

Such methods may involve computing, based on the electrical signals, a first measured acoustic power ratio. The first measured acoustic power ratio may correspond to a ratio of the first measured acoustic power of the reproduced top-firing speaker acoustic test signals to the first measured acoustic power of the reproduced front-firing speaker acoustic test signals. Some methods may involve determining, based at least in part on the first measured acoustic power ratio, a compensating gain to be applied to the top-firing speaker or the front-firing speaker in order to produce the desired acoustic power ratio. Some methods may involve sending (for example, via a wireless interface of the mobile device) a compensating gain signal corresponding to the compensating gain.

In some examples, determining the desired acoustic power ratio may involve receiving speaker product information and obtaining, from a data structure stored in a memory, a product-specific desired acoustic power ratio corresponding to the speaker product information. For example, the obtaining may involve obtaining the product-specific desired acoustic power ratio from a memory of the mobile device. In some instances, the obtaining may involve obtaining the product-specific desired acoustic power ratio from a memory of another device, via an interface of the mobile device. The interface may, for example, be the wireless interface, a user interface or a port of the mobile device. Some methods also may involve receiving test signal differentiating information for differentiating the reproduced top-firing speaker acoustic test signals from the reproduced front-firing speaker acoustic test signals.

Some methods may involve determining that a first stage of the speaker calibration process has concluded and providing a second user prompt indicating that the user should position the mobile device in a second location during a second stage of the speaker calibration process. Some methods may involve sending (for example, via the wireless interface of the mobile device) at least one signal indicating that the first top-firing speaker should reproduce the top-firing speaker acoustic test signals and that the first front-firing speaker should reproduce the front-firing speaker acoustic test signals for the second stage of the speaker calibration process.

Some methods may involve receiving (for example, from the microphone of the mobile device) second electrical signals corresponding to second measured acoustic power of the reproduced top-firing speaker acoustic test signals and second measured acoustic power of the reproduced front-firing speaker acoustic test signals. Some methods may involve computing, based on the second electrical signals, a second measured acoustic power ratio, the second measured acoustic power ratio corresponding to a ratio of the second measured acoustic power of the reproduced top-firing speaker acoustic test signals to the second measured acoustic power of the reproduced front-firing speaker acoustic test signals. Some methods may involve determining the compensating gain based, at least in part, on the first measured acoustic power ratio and the second measured acoustic power ratio.

The compensating gain may, for example, be a broadband compensating gain. In some implementations, the compensating gain may be a first frequency-dependent compensating gain for a first frequency band. The first electrical signals may correspond to first measured acoustic power of the first frequency band. Some such methods also may involve receiving (for example, from the microphone of the mobile device) second electrical signals corresponding to second measured acoustic power of the reproduced top-firing speaker acoustic test signals in a second frequency band and second measured acoustic power of the reproduced front-firing speaker acoustic test signals in the second frequency band. Such methods may involve computing, based on the electrical signals, a second measured acoustic power ratio.

The second measured acoustic power ratio may correspond to a ratio of the second measured acoustic power of the reproduced top-firing speaker acoustic test signals to the second measured acoustic power of the reproduced front-firing speaker acoustic test signals. Such methods may involve determining, based at least in part on the second measured acoustic power ratio, a second frequency-dependent compensating gain for the second frequency band.

The methods disclosed herein may be implemented via hardware, firmware, software stored in one or more non-transitory media, and/or combinations thereof. Such non-transitory media may include random access memory (RAM) and/or read-only memory (ROM). The non-transitory media may include one or more suitable types of non-transitory storage media, such as flash memory, a hard drive, etc. Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Although the following figures depict various examples, the one or more implementations are not limited to the examples depicted in the figures.

Like reference numbers and designations in the various drawings indicate like elements.

DESCRIPTION OF EXAMPLE EMBODIMENTS

Figure 1:
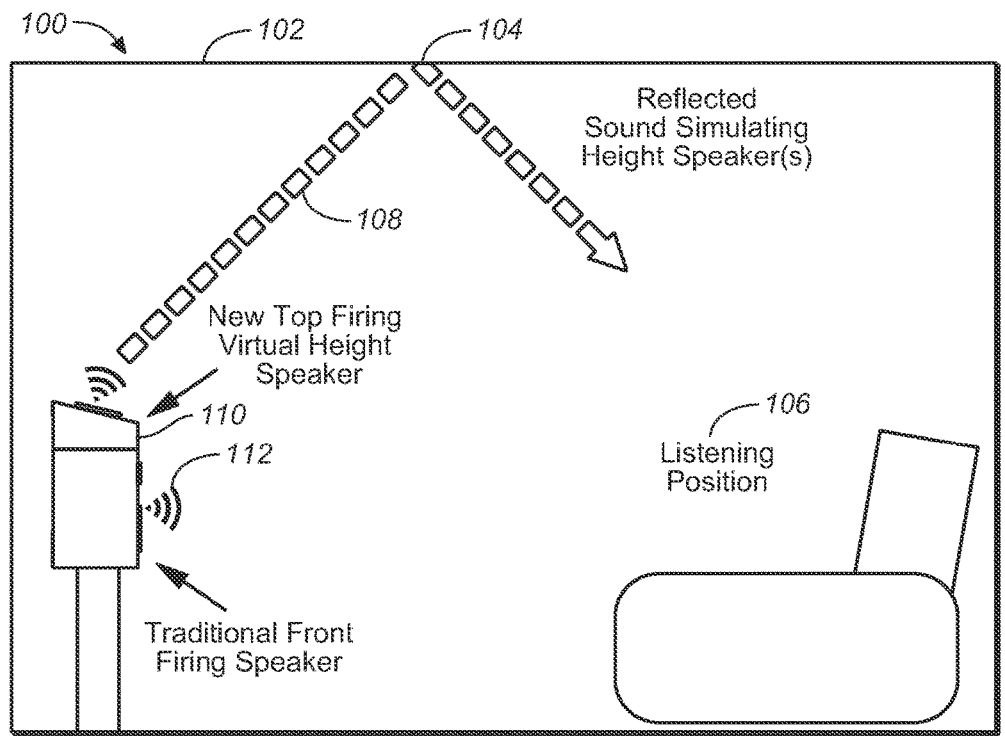
FIG. 1 illustrates the use of an upward-firing driver using reflected sound to simulate an overhead speaker in a listening environment.

The following description is directed to certain implementations for the purposes of describing some innovative aspects of this disclosure, as well as examples of contexts in which these innovative aspects may be implemented. However, the teachings herein can be applied in various different ways. For example, while various implementations are described in terms of particular playback environments, the teachings herein are widely applicable to other known playback environments, as well as playback environments that may be introduced in the future. Moreover, the described implementations may be implemented, at least in part, in various devices and systems as hardware, software, firmware, cloud-based systems, etc. Accordingly, the teachings of this disclosure are not intended to be limited to the implementations shown in the figures and/or described herein, but instead have wide applicability.

Systems and methods are described for an adaptive audio system that renders reflected sound for adaptive audio systems through upward-firing speakers that incorporate virtual height filter circuits for rendering object based audio content using reflected sound to reproduce overhead sound objects and provide virtual height cues. Aspects of the one or more embodiments described herein may be implemented in an audio or audio-visual (AV) system that processes source audio information in a mixing, rendering and playback system that includes one or more computers or processing devices executing software instructions. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

For purposes of the present description, the following terms have the associated meanings: the term "channel" means an audio signal plus metadata in which the position is coded as a channel identifier, e.g., left-front or right-top surround; "channel-based audio" is audio formatted for playback through a pre-defined set of speaker zones with associated nominal locations, e.g., 5.1, 7.1, and so on; the term "object" or "object-based audio" means one or more audio channels with a parametric source description, such as apparent source position (e.g., 3D coordinates), apparent source width, etc.; and "adaptive audio" means channel-based and/or object-based audio signals plus metadata that renders the audio signals based on the playback environment using an audio stream plus metadata in which the position is coded as a 3D position in space; and "listening environment" means any open, partially enclosed, or fully enclosed area, such as a room that can be used for playback of audio content alone or with video or other content, and can be embodied in a home, cinema, theater, auditorium, studio, game console, and the like. Such an area may have one or more surfaces disposed therein, such as walls or baffles that can directly or diffusely reflect sound waves.

Embodiments are directed to a reflected sound rendering system that is configured to work with a sound format and processing system that may be referred to as a "spatial audio system" or "adaptive audio system" that is based on an audio format and rendering technology to allow enhanced audience immersion, greater artistic control, and system flexibility and scalability. An overall adaptive audio system generally comprises an audio encoding, distribution, and decoding system configured to generate one or more bitstreams containing both conventional channel-based audio elements and audio object coding elements. Such a combined approach provides greater coding efficiency and rendering flexibility compared to either channel-based or object-based approaches taken separately. An example of an adaptive audio system that may be used in conjunction with present embodiments is described in U.S. Provisional Patent Application 61/636,429, filed on Apr. 20, 2012 and entitled "System and Method for Adaptive Audio Signal Generation, Coding and Rendering," which is hereby incorporated by reference.

In general, audio objects can be considered as groups of sound elements that may be perceived to emanate from a particular physical location or locations in the listening environment. Such objects can be static (stationary) or dynamic (moving). Audio objects are controlled by metadata that defines the position of the sound at a given point in time, along with other functions. When objects are played back, they are rendered according to the positional metadata using the speakers that are present, rather than necessarily being output to a predefined physical channel.

An example implementation of an adaptive audio system and associated audio format is the Dolby® Atmos™ platform. Such a system incorporates a height (up/down) dimension that may be implemented as a 9.1 surround system, or similar surround sound configuration (e.g., 11.1, 13.1, 19.4, etc.). A 9.1 surround system may comprise composed five speakers in the floor plane and four speakers in the height plane. In general, these speakers may be used to produce sound that is designed to emanate from any position more or less accurately within the listening environment. In a typical commercial or professional implementation speakers in the height plane are usually provided as ceiling mounted speakers or speakers mounted high on a wall above the audience, such as often seen in a cinema. These speakers provide height cues for signals that are intended to be heard above the listener by directly transmitting sound waves down to the audience from overhead locations.

Virtual Height Speaker System

In many cases, such as typical home environments, ceiling mounted overhead speakers are not available or practical to install. In this case, the height dimension must be provided by floor or low wall mounted speakers. In an embodiment, the height dimension is provided by upward-firing speakers that simulate height speakers by reflecting sound off of the ceiling. In an adaptive audio system, certain virtualization techniques are implemented by the renderer to reproduce overhead audio content through these upward-firing speakers, and the speakers use the specific information regarding which audio objects should be rendered above the standard horizontal plane to direct the audio signals accordingly.

For purposes of description, the term "driver" means a single electroacoustic transducer that produces sound in response to an electrical audio input signal. A driver may be implemented in any appropriate type, geometry and size, and may include horns, cones, ribbon transducers, and the like. The term "speaker" means one or more drivers in a unitary enclosure, and the terms "cabinet" or "housing" mean the unitary enclosure that encloses one or more drivers.

FIG. 1 illustrates the use of an upward-firing driver using reflected sound to simulate one or more overhead speakers. Diagram 100 illustrates an example in which a listening position 106 is located at a particular place within a listening environment. The system does not include any height speakers for transmitting audio content containing height cues. Instead, the speaker cabinet or speaker array includes an upward-firing driver along with the front firing driver(s). The upward-firing driver is configured (with respect to location and inclination angle) to send its sound wave 108 up to a particular point 104 on the ceiling 102 where it reflected back down to the listening position 106. It is assumed that the ceiling is made of an appropriate material and composition to adequately reflect sound down into the listening environment. The relevant characteristics of the upward-firing driver (e.g., size, power, location, etc.) may be selected based on the ceiling composition, room size, and other relevant characteristics of the listening environment.

The embodiment of FIG. 1 illustrates a case in which the forward firing driver or drivers are enclosed within a first cabinet 112, and the upward firing driver is enclosed within a second separate cabinet 110. The upward firing speaker 110 for the virtual height speaker is generally placed on top of the forward firing speaker 112, but other orientations are also possible. It should be noted that any number of upward-firing drivers could be used in combination to create multiple simulated height speakers. Alternatively, a number of upward-firing drivers may be configured to transmit sound to substantially the same spot on the ceiling to achieve a certain sound intensity or effect.

Figure 2:
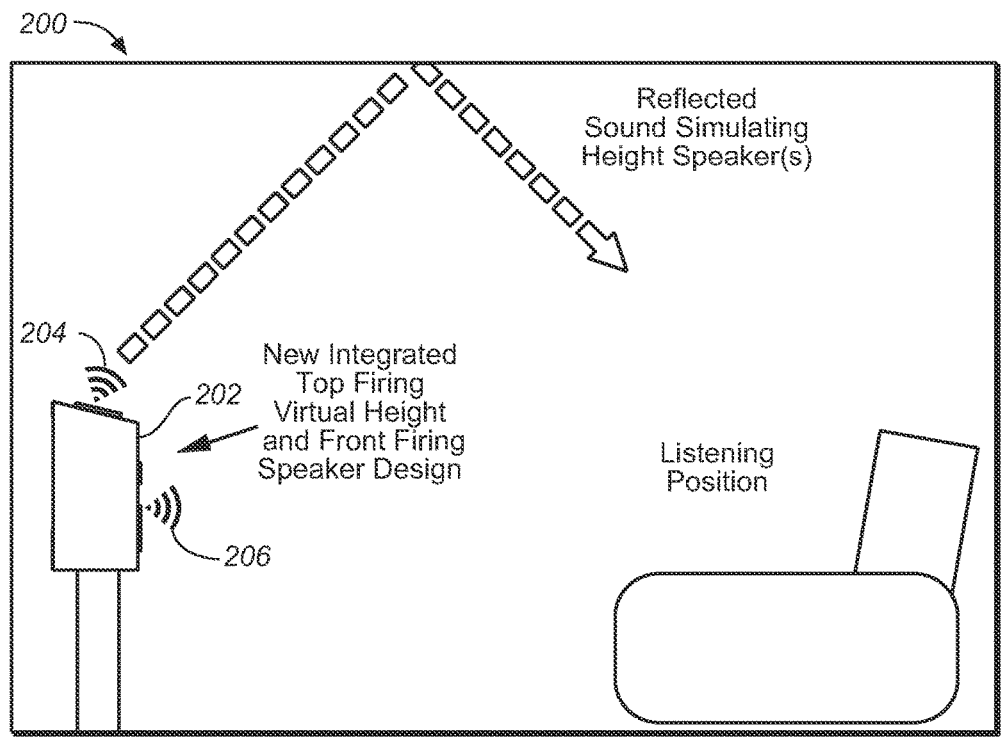
FIG. 2 illustrates an integrated virtual height and front firing speaker, under an embodiment.

FIG. 2 illustrates an embodiment in which the upward firing driver(s) and forward firing driver(s) are provided in the same cabinet. As shown in FIG. 2, speaker cabinet 202 includes both the forward firing driver 206 and the upward firing driver 204. Although only one upward-firing driver is shown in each of FIG. 1 and FIG. 2, multiple upward-firing drivers may be incorporated into a reproduction system in some embodiments. For the embodiment of FIGS. 1 and 2, it should be noted that the drivers may be of any appropriate, shape, size and type depending on the frequency response characteristics required, as well as any other relevant constraints, such as size, power rating, component cost, and so on.

As shown in FIGS. 1 and 2, the upward firing drivers are positioned such that they project sound at an angle up to the ceiling where it can then bounce back down to a listener. The angle of tilt may be set depending on listening environment characteristics and system requirements. For example, the upward driver 204 may be tilted up between 20 and 60 degrees and may be positioned above the front-firing driver 206 in the speaker enclosure 202 so as to minimize interference with the sound waves produced from the front-firing driver 206. The upward-firing driver 204 may be installed at a fixed angle, or it may be installed such that the tilt angle may be adjusted manually. Alternatively, a servo mechanism may be used to allow automatic or electrical control of the tilt angle and projection direction of the upward-firing driver. For certain sounds, such as ambient sound, the upward-firing driver may be pointed straight up out of an upper surface of the speaker enclosure 202 to create what might be referred to as a "top-firing" driver. In this case, a large component of the sound may reflect back down onto the speaker, depending on the acoustic characteristics of the ceiling. In most cases, however, some tilt angle is usually used to help project the sound through reflection off the ceiling to a different or more central location within the listening environment.

In an embodiment, the adaptive audio system utilizes upward-firing drivers to provide the height element for overhead audio objects. In general, it has been shown that incorporating signal processing to introduce perceptual height cues into the audio signal being fed to the upward-firing drivers improves the positioning and perceived quality of the virtual height signal. For example, a parametric perceptual binaural hearing model has been developed to create a virtual height filter, which when used to process audio being reproduced by an upward-firing driver, improves that perceived quality of the reproduction. In an embodiment, the virtual height filter is derived from the both the physical speaker location (approximately level with the listener) and the reflected speaker location (above the listener). For the physical speaker location, a directional filter is determined based on a model of the outer ear (or pinna), also referred to as the 'parametric pinna model.' An inverse of this filter is next determined and used to remove the height cues from the physical speaker. Next, for the reflected speaker location, a second directional filter is determined, using the same model of the outer ear. This filter is applied directly, essentially reproducing the cues the ear would receive if the sound were above the listener. In practice, these filters may be combined in a way that allows for a single filter that both removes the height cue from the physical speaker location, and inserts the height cue from the reflected speaker location.

Figure 3:
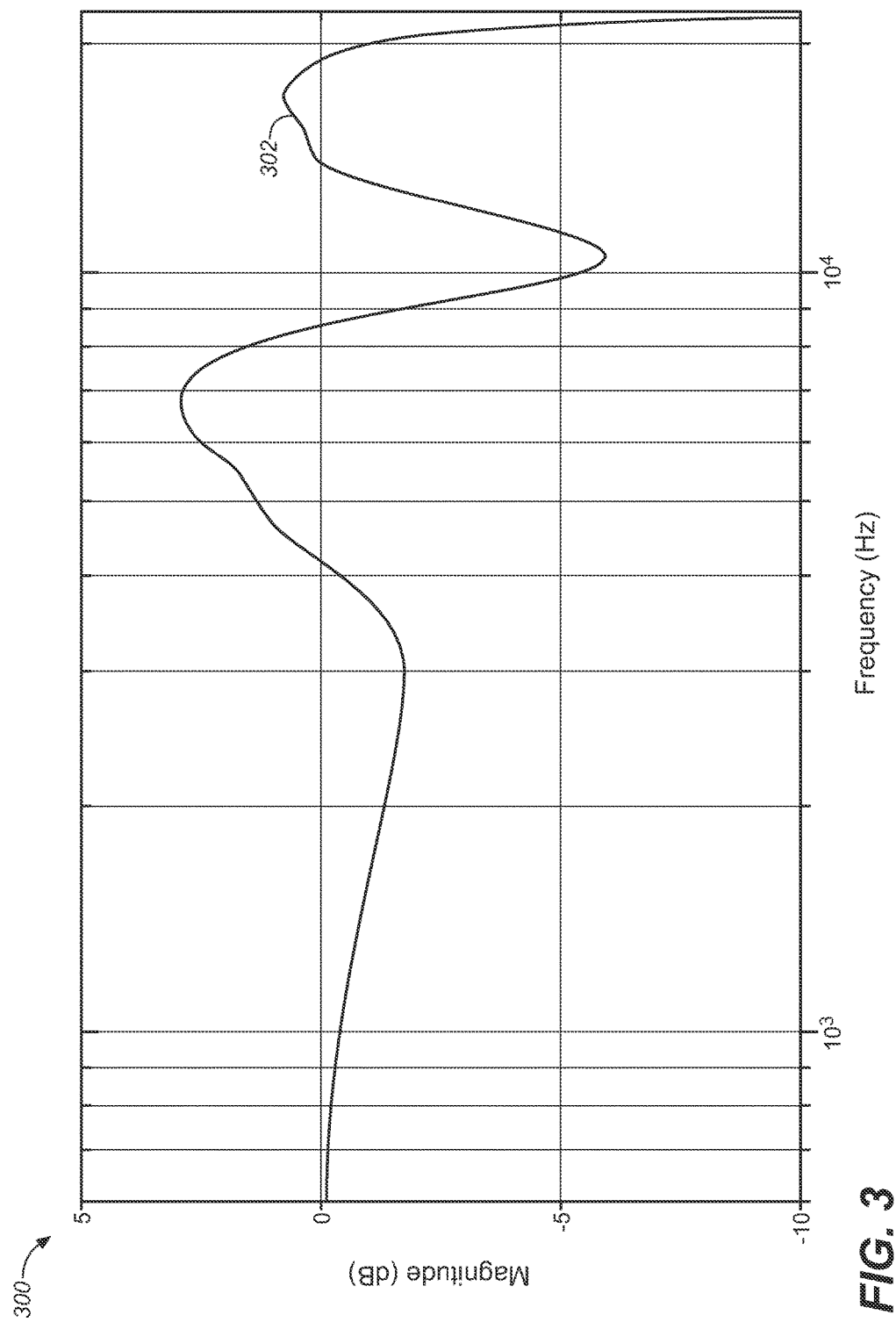
FIG. 3 is a graph that illustrates the magnitude response of a virtual height filter using a parametric pinna model, under an embodiment.

FIG. 3 is a graph that illustrates an example frequency response from a parametric pinna model for overhead sounds, and this model is applied to a virtual height filter, under an embodiment. Graph 300 shows the magnitude (in dB) versus frequency (in Hz) for a response curve 302 in which the magnitude response is given by the ratio of the pinna response from the desired elevation of the reflected sound to the pinna response at zero elevation. The desired elevation represents the angle of inclination of the upward-firing driver relative to the horizontal ground plane of the room. If $P_1$ represents the response of the horizontal component of the sound and $P_2$ represents the response of the upward-firing (reflected) component of the sound, then the total response of the filter $P_T$ can be expressed as: $P_T=(P_2/P_1)\alpha$, where is a scaling factor (e.g., $\alpha=0.5$), and the angle of the upward firing component determines the characteristic of $P_2$. In general, the parametric pinna response model 302 generally corresponds to a characteristic bump in magnitude followed by a notch for a certain frequency range in the upper audible frequency range.

The virtual height filter is configured to approximate the pinna response curve 302 of FIG. 3. The virtual height filter may be used in a fashion that allows for some adjustability with respect to the aggressiveness or amount of filtering that is applied. For example, in some cases, it may be beneficial to not fully remove the physical speaker height cue, or fully apply the reflected speaker height cue since only some of the sound from the physical speaker arrives directly to the listener (with the remainder being reflected off the ceiling).

Figure 4A:
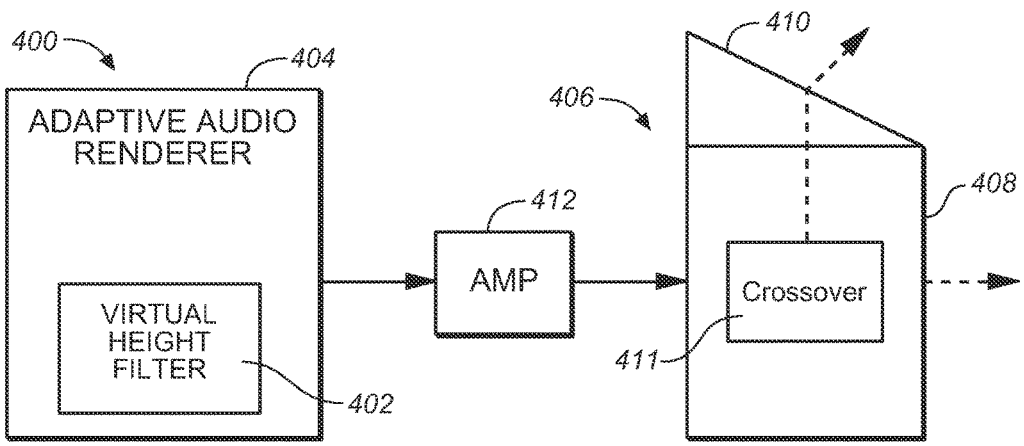
FIG. 4A is a block diagram illustrating the use of a virtual height filter circuit with a virtual height speaker, under an embodiment.

The typical use of such a virtual height filter for virtual height rendering is for audio to be pre-processed by a filter exhibiting the magnitude response 302 shown in FIG. 3, before it is played through the upward-firing virtual height speaker. This filter pre-processing can take place in the rendering equipment prior to input to a speaker amplifier (i.e., an AV receiver or preamp), in the speaker amplifier prior to amplification or in the physical loudspeaker system following amplification (e.g., using analog components). FIG. 4A is a diagram illustrating the use of a virtual height filter circuit with a virtual height speaker, under an embodiment. As shown in diagram 400, a virtual height filter 402 is provided as a component within an adaptive audio renderer 404. The filtered output signal is then sent through an amplifier 412 to a virtual height speaker 406 that comprises forward firing driver 408 and upward firing driver 410. If the signal from the renderer 404 is a full bandwidth signal, an internal speaker crossover 411 may be used to separate the signal to send the low frequency audio to the front-firing speakers and the high frequency audio to the upward-firing speaker 410. The virtual height filter 402 may be provided as an integrated component within the renderer 404, as shown, or it may be an external component associated with the renderer. It may also be provided as part of the amplifier circuit 412 between the renderer 404 and the speaker 406.

Figure 4B:
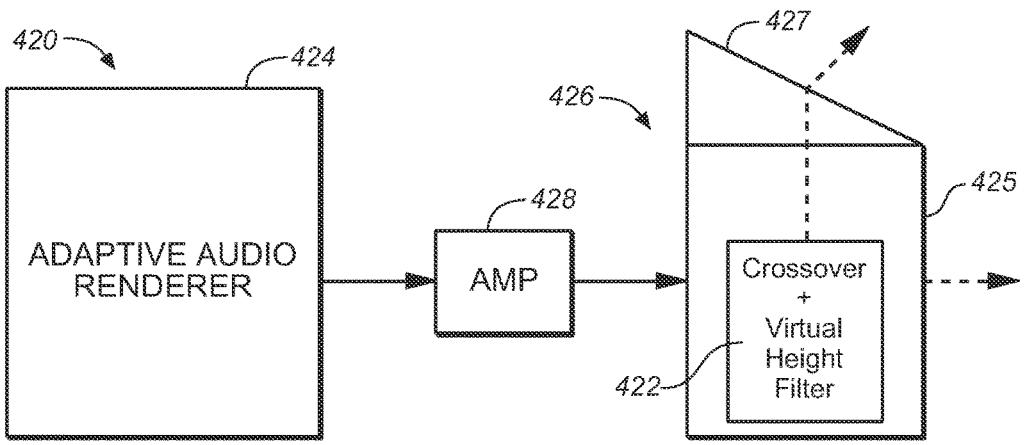
FIG. 4B is a block diagram illustrating a virtual height filter circuit integrated with a virtual height speaker under an embodiment.

In an embodiment, the virtual height filter component can also be provided in the speaker itself. In certain implementations, the incorporation of virtual height filtering in the speaker may be particularly beneficial, such as due to the fact that a typical speaker already filters the audio to be reproduced through the transducers in the form of a crossover filter. FIG. 4B is a diagram illustrating a virtual height filter circuit integrated with a virtual height speaker under an embodiment. In the embodiment of diagram 420, the virtual height filter 422 is provided as a circuit within the virtual height speaker 426. In the case where the output from the renderer 424 is a full bandwidth signal, the virtual height speaker may be integrated with a crossover that may be used to separate the signal to send the low frequency audio to the front-firing speakers 425 and the high frequency audio to the upward-firing speaker 427. The virtual height filter 422 may be provided as an integrated component within the speaker 426, as shown, or it may be an external component associated with the speaker and coupled between the amplifier circuit 428 and the speaker 426.

Figure 4C:
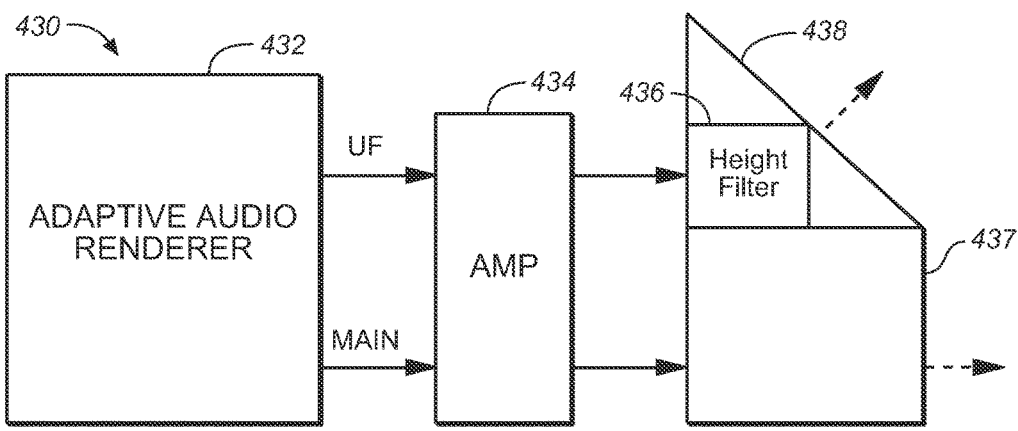
FIG. 4C is a diagram illustrating a virtual height filter circuit integrated with an upward-firing speaker under an embodiment.

In some embodiments, the renderer may output separate signals to drive the upward-firing speaker separately from the front-firing speakers. In this case, no separate crossover function is necessarily needed. FIG. 4C is a diagram illustrating a virtual height filter circuit integrated with an upward-firing speaker, under an embodiment. As shown in diagram 430 of FIG. 4C, renderer 432 sends an upward firing (UF) audio signal through amp 434 to an upward-firing speaker 438, as well as a main audio signal to front-firing speaker 437. These signals are already separated with respect to frequency band, if required. The upward-firing speaker 438 includes a virtual height filter component 436 that applies the virtual height filtering function directly onto the UF signals sent by the renderer 432. This embodiment facilitates the use and installation of dedicated virtual height filter speakers (e.g., upward-firing speaker 438) with existing or older technology speaker cabinets (e.g., front-firing speaker 437).

As shown in FIGS. 4A-4B, the virtual height filter function is performed on specific frequency bands, and typically the high frequency bands of the full bandwidth audio signal. The separation of the signal can be performed using crossover circuits, such as shown in FIGS. 4A and 4B, or it may be performed using separation techniques in the renderer, as shown in FIG. 4C. Regardless of frequency separation technique, the virtual height filter function is selectively applied on only certain frequencies as defined by a threshold or cutoff frequency. Thus, for the example embodiments illustrated in FIGS. 4A-4C, an explicit threshold frequency, $f_T$, is defined above which virtual height filtering is performed and below which no virtual height filtering is performed. Thus, in an example implementation, where $f_T$=2 KHz, for audio <2 KHz, no filter is applied and for audio >2 Khz, the virtual height filter is applied.

Figure 5:
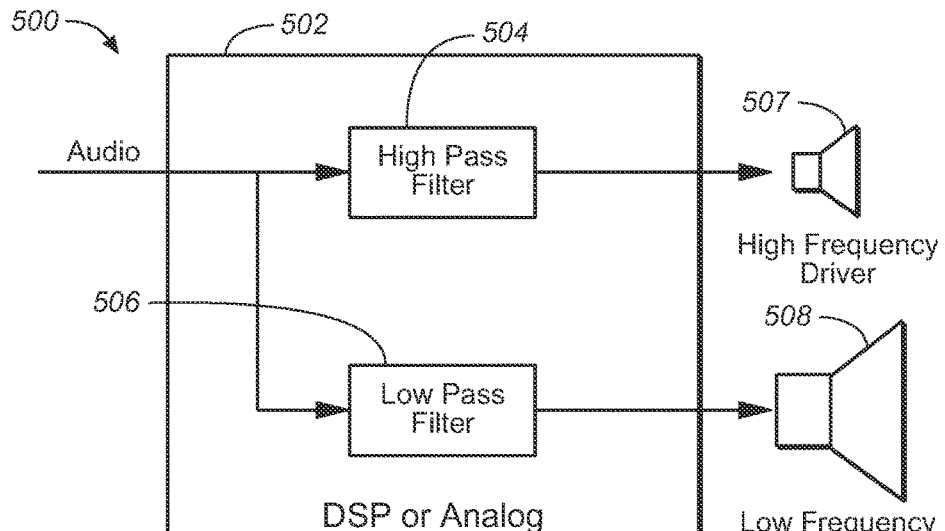
FIG. 5 is a high-level circuit diagram of a two-band crossover filter used in conjunction with a virtual height filter, under an embodiment.

In an embodiment, such as that shown in FIG. 4B, the virtual height filter is implemented as part of or using a crossover filter circuit used with the speaker. A crossover filter typically separates the audio into two or three frequency bands with filtered audio from the different bands being sent to the appropriate drivers within the speaker. For example in a two-band crossover, the lower frequencies are sent to a larger driver capable of faithfully reproducing low frequencies (e.g., woofer/midranges) and the higher frequencies are typically sent to smaller transducers (e.g., tweeters) that are more capable of faithfully reproducing higher frequencies. FIG. 5 is a high-level circuit diagram of a two-band crossover filter used in conjunction with a virtual height filter, under an embodiment. As shown in diagram 500, an audio signal input to crossover circuit 502 is sent to a high-pass filter 504 and a low-pass filter 506. The crossover 502 is set or programmed with a particular cut-off frequency that defines the crossover point. This frequency may be static or it may be variable (i.e., through a variable resistor circuit in an analog implementation or a variable crossover parameter in a digital implementation). The high-pass filter 504 cuts the low frequency signals (those below the cut-off frequency) and sends the high frequency component to the high frequency driver 507. Similarly, the low-pass filter 506 cuts the high frequencies (those above the cut-off frequency) and sends the low frequency component to the low frequency driver 508. A three-way crossover functions similarly except that there are two crossover points and three band-pass filters to separate the input audio signal into three bands for transmission to three separate drivers, such as tweeters, mid-ranges, and woofers.

The crossover circuit 502 may be implemented as an analog circuit using known analog components (e.g., capacitors, inductors, resistors, etc.) and known circuit designs. Alternatively, it may be implemented as a digital circuit using digital signal processor (DSP) components, logic gates, programmable arrays, or other digital circuits.

Figure 6:
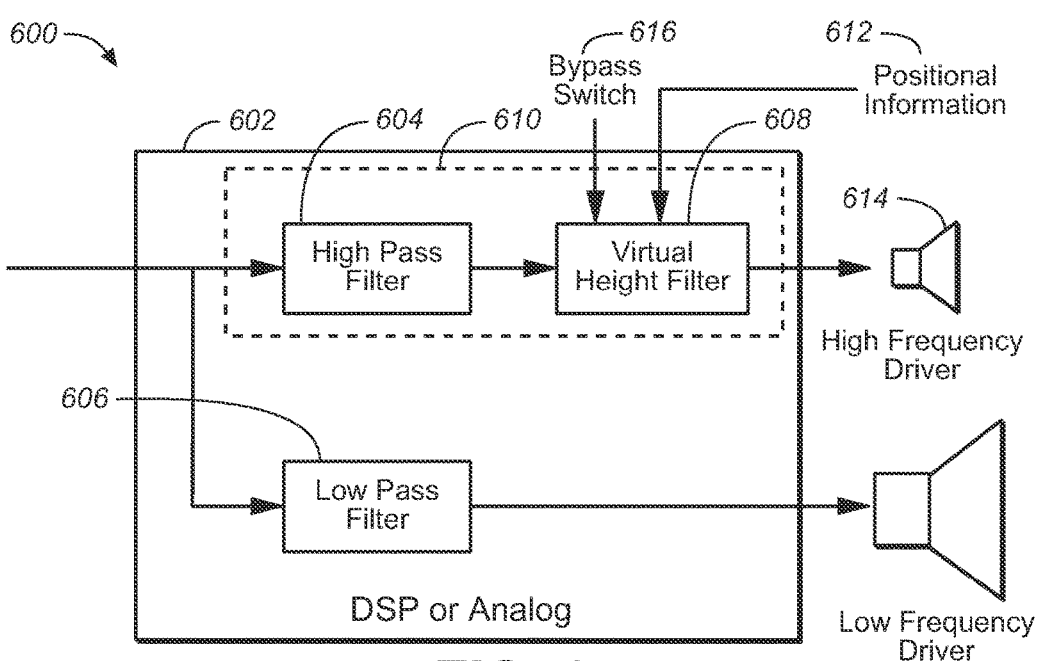
FIG. 6 illustrates a two-band crossover that implements virtual height filtering in the high-pass filtering path, under an embodiment.

The crossover circuit of FIG. 5 can used to implement at least a portion of the virtual height filter, such as virtual height filter 422 of FIG. 4B. In a typical implementation, most of the virtual height filtering takes place in the higher frequencies. This is due to that fact that, in general, a majority of the height cues are present above 3-4 KHz in a typical sound track using adaptive audio content. This frequency range corresponds to the cut-off frequency for many two-way crossovers. FIG. 6 illustrates a two-band crossover that implements virtual height filtering in the high-pass filtering path, under an embodiment. As shown in diagram 600, crossover 602 includes low-pass filter 606 and high-pass-filter 604. The high-pass filter is part of a circuit 610 that includes a virtual height filter component 608. The virtual height filter 608 applies the parametric pinna model magnitude response curve 302 to the high-pass filtered signal from filter 604 prior to transmission to the high-frequency driver 614.

A bypass switch 616 may be provided to allow the system or user to bypass the virtual height filter circuit during calibration or setup operations so that other audio signal processes can operate without interfering with the virtual height filter. The switch 616 can either be a manual user operated toggle switch that is provided on the speaker or rendering component where the filter circuit resides, or it may be an electronic switch controlled by software, or any other appropriate type of switch.

The embodiment of FIG. 6 illustrates a virtual height filter used with the high-pass filter stage of a crossover. It should be noted in an alternative embodiment, a virtual height filter may be used with the low-pass filter so that that the lower frequency band could also be modified so as to mimic the lower frequencies of the response as shown in FIG. 3. However, in most practical applications, the crossover may be unduly complicated in light of the minimal height cues present in the low-frequency range.

Figure 7:
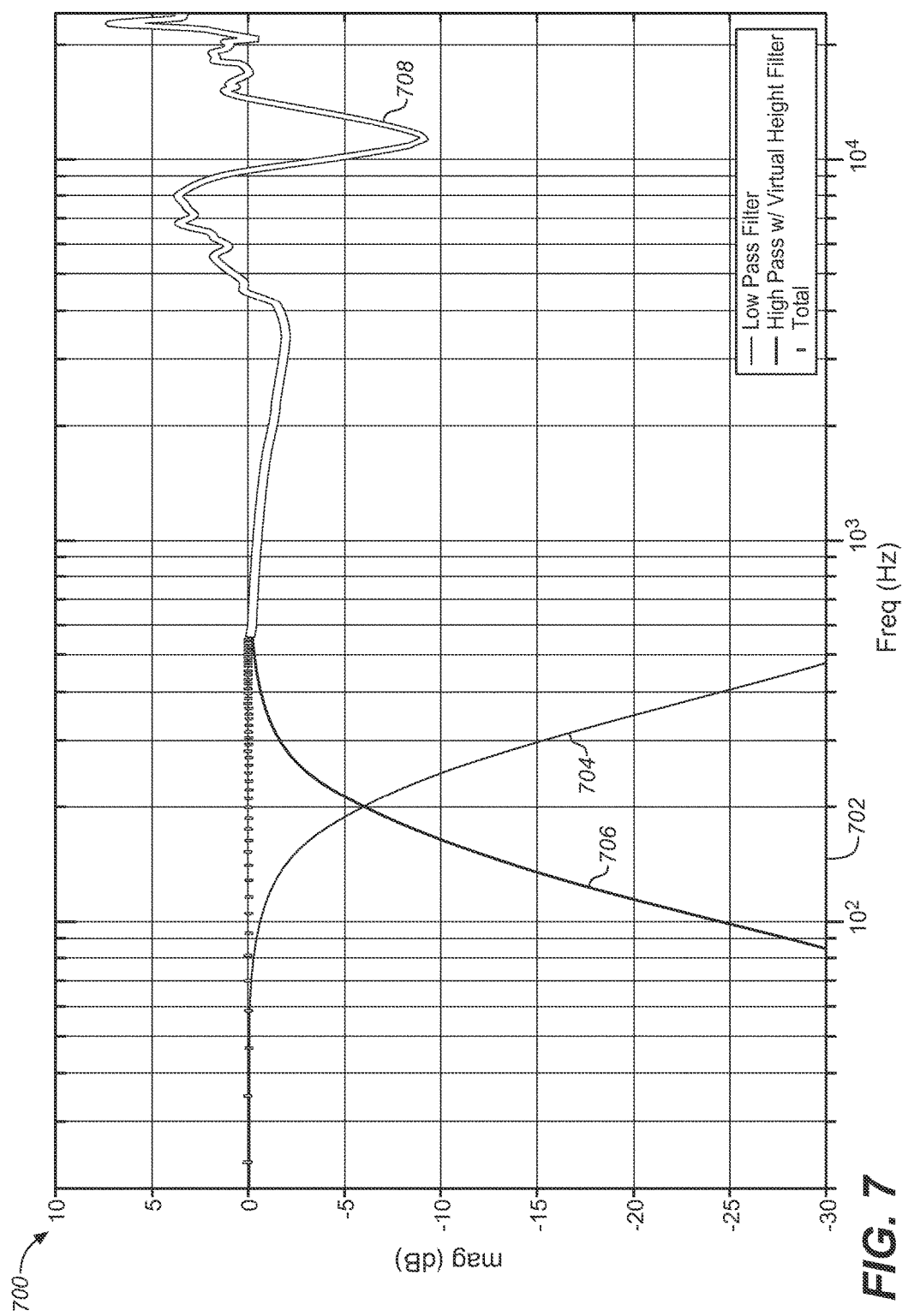
FIG. 7 shows the frequency response of the two-band crossover of FIG. 6, under an embodiment.

FIG. 7 illustrates the frequency response of the two-band crossover of FIG. 6, under an embodiment. As shown in diagram 700, the crossover has a cut-off frequency of 702 to create a frequency response curve 704 of the low-pass filter that cuts frequencies above the cut-off frequency 702, and a frequency response curve 706 for the high-pass filter that cuts frequencies below the cut-off frequency 702. The virtual height filter curve 708 is superimposed over the high-pass filter curve 706 when the virtual height filter is applied to the audio signal after the high-pass filter stage.

Figure 8:
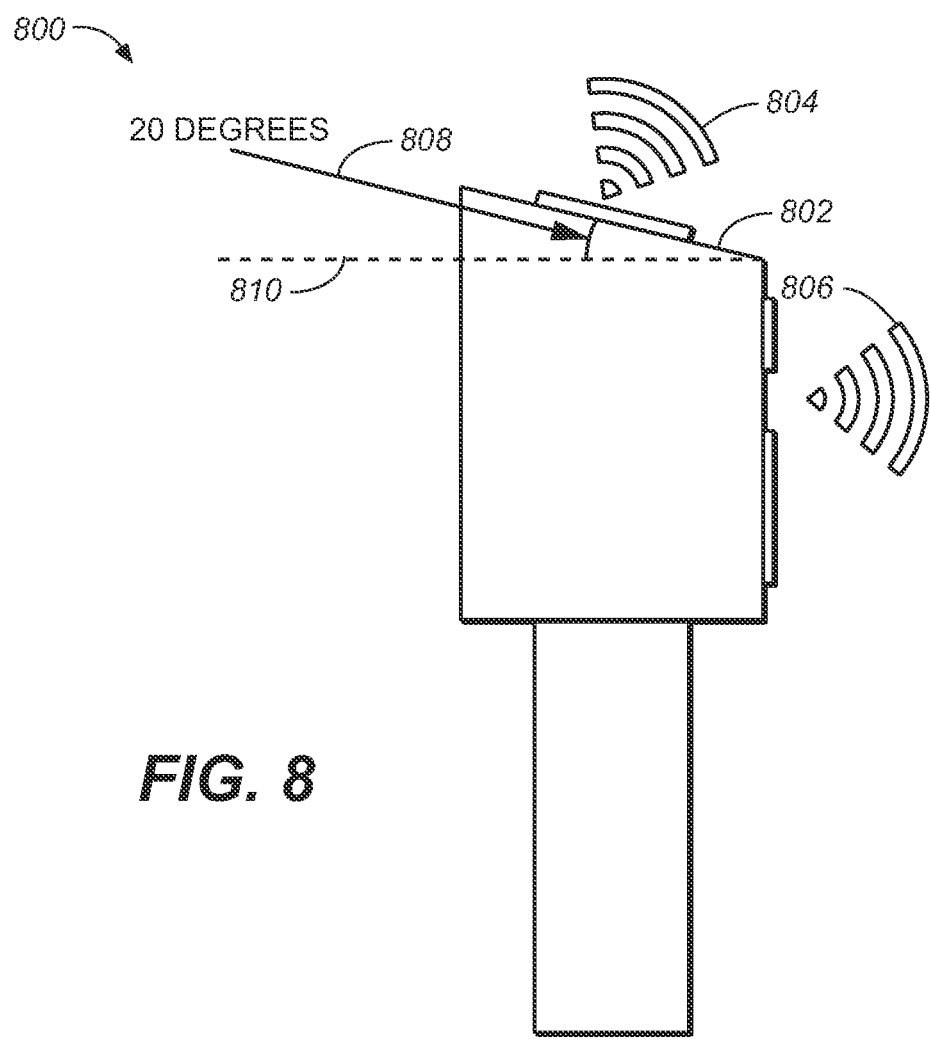
FIG. 8 illustrates an inclination angle of an upward-firing driver used in a virtual height speaker, under an embodiment.

As shown in FIG. 6, positional information 612 is also provided to the virtual height filter 608. This positional information can be used to adjust the virtual height filter magnitude response based on the angle of the virtual height speaker. As shown in FIG. 2, the virtual height speaker provides virtual height cues for overhead sounds by projecting the sound waves toward the ceiling for reflection down to a listener at an upward angle relative to the ground. This angle can be set to any desired angle depending on the characteristics of the audio signals and drivers, and the constraints and characteristics of the playback environment. A typical and effective angle for most cases is about 20 degrees. FIG. 8 illustrates an inclination angle of an upward-firing driver used in a virtual height speaker, under an embodiment. As shown in diagram 800, speaker cabinet 802 includes forward-firing driver(s) 806 and upward-firing driver 804. The upward-firing driver is positioned at an angle 808 relative to the ground or horizontal plane defining the axis of transmission 810 of the forward-firing driver 806. FIG. 8 illustrates an example case in which angle=20 degrees.

Figure 9:
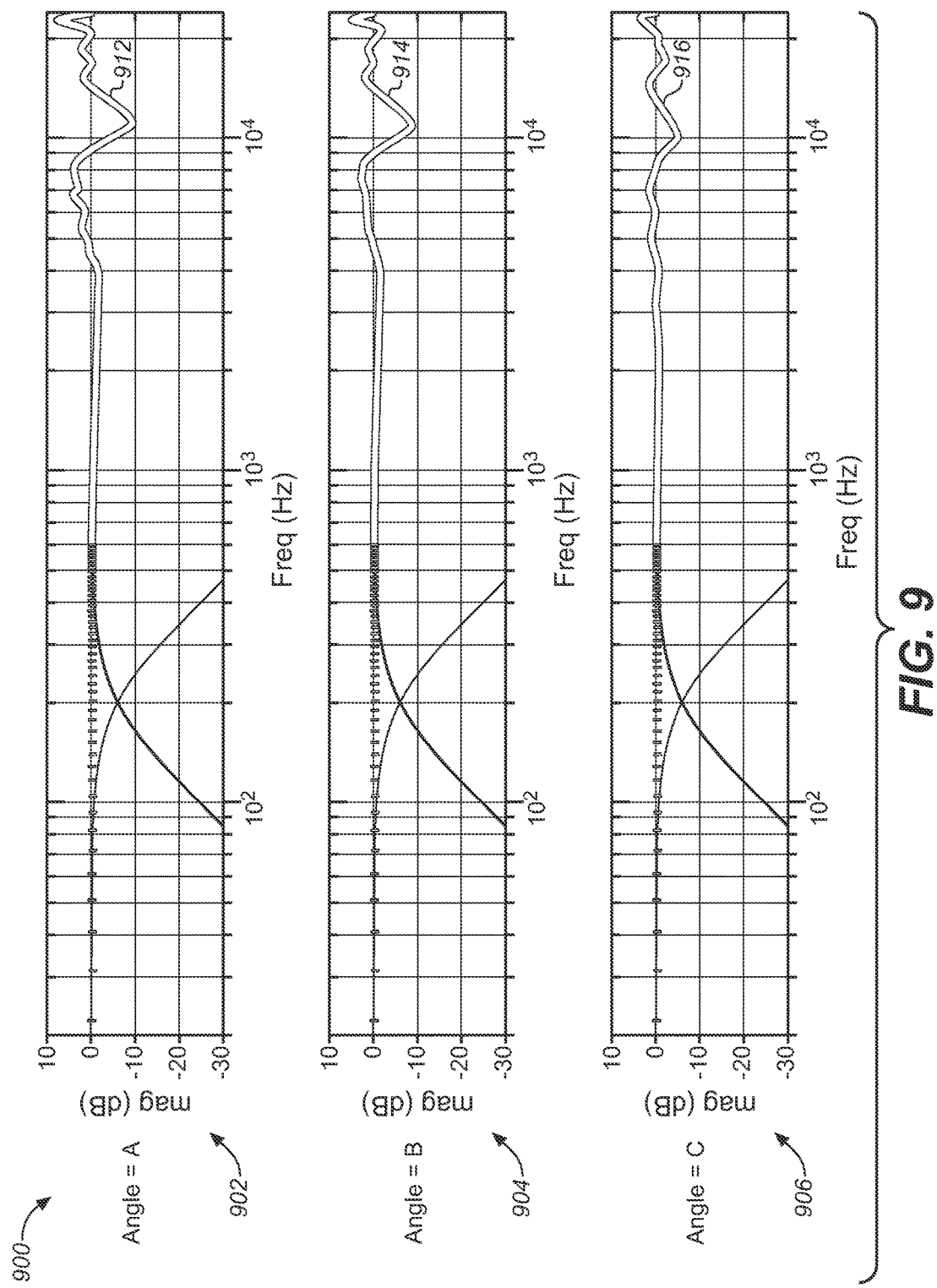
FIG. 9 illustrates the variance of the virtual height filter response corresponding to different inclination angles.

The inclination angle 808 may be changed depending on the configuration of the speaker 802, or it may be changed through manual or electronic configuration, if the upward-firing driver 804 is movable with respect to the forward firing driver 806, such as through a hinged cabinet or servo-controlled arrangement. As the angle 808 is changed, the frequency response of the virtual height filter will also change based on the pinna model. FIG. 9 illustrates the variance of the virtual height filter response corresponding to different inclination angles. Diagram 900 illustrates the frequency response curves for three different example angles A, B, and C, where A>B>C. Graph 902 illustrates the curve 912 for a first angle, A; graph 904 illustrates the curve 914 for a second angle, B; and graph 906 illustrates the curve 916 for a third angle, C. As can be seen in FIG. 9, the magnitude of the dip at the higher frequencies is reduced as the angle decreases. Thus, at an inclination angle of near 0 degrees, the frequency response at higher frequencies approaches a flat response as associated with an ideal high-pass filter. Likewise, at great inclination angles, such as between 45 to 90 degrees, the frequency response at higher frequencies exhibits a greater drop in magnitude.

In addition to the inclination angle, other positional information, such as the height of the ceiling, the distance of the speaker to the listener, the shape and composition of the ceiling surface, and other similar information may be input to optimize the exact form of the virtual height filter.

The crossover implementation shown in FIG. 6 assumes that the upward-firing virtual height speaker is implemented using two drivers, one for low frequencies and one for high frequencies. However, this configuration may not be ideal under most conditions. Specific and controlled directionality of an upward-firing speaker is often critical for effective virtualization. For example, a single transducer speaker is usually more effective when implementing the virtual height speaker. Additionally, a smaller, single transducer (i.e., 3" in diameter) is preferred as it is more directional at higher frequencies and more affordable than a larger transducer.

Figure 10:
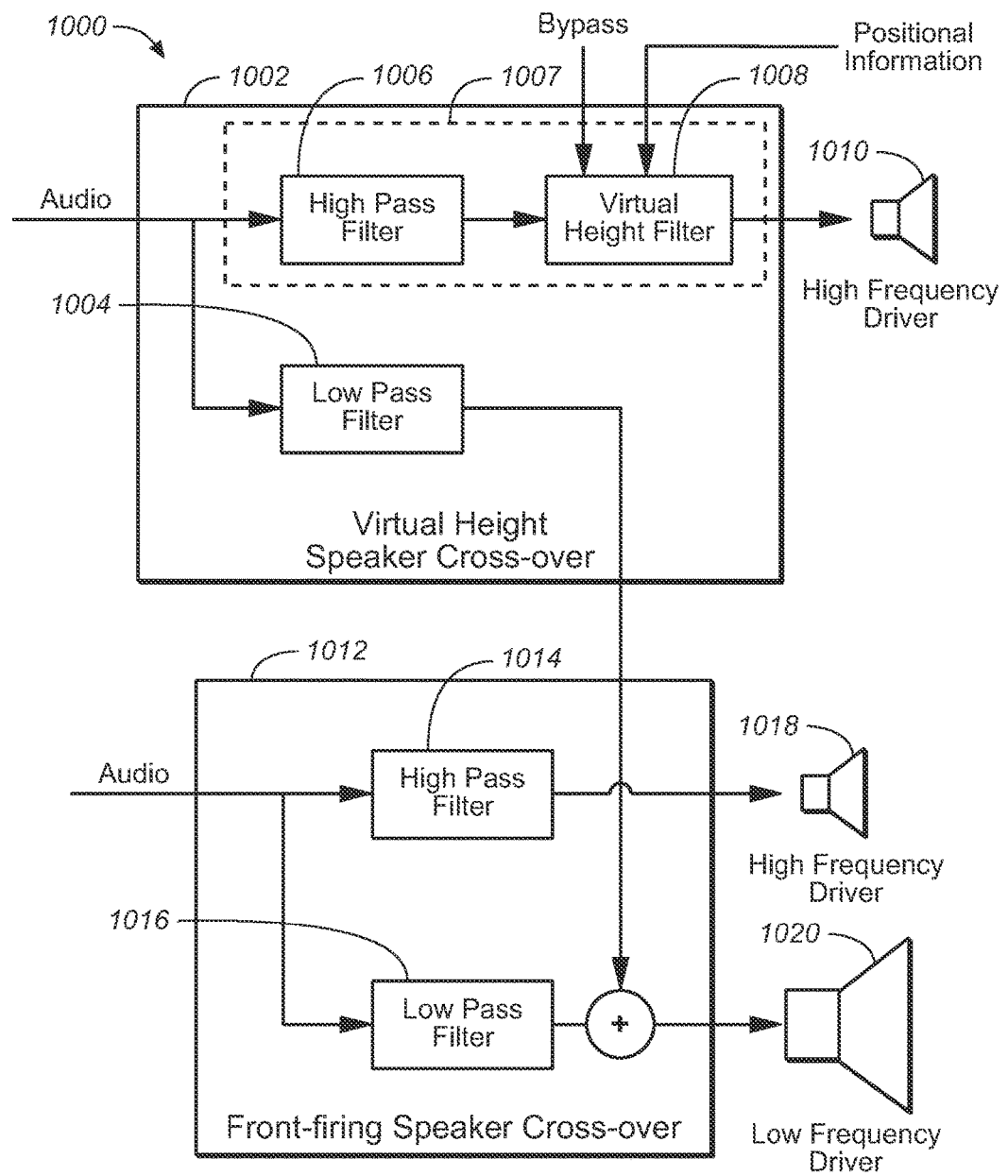
FIG. 10 illustrates a crossover that combines upward-firing and front-firing speaker crossover filter networks for use with different high-frequency drivers, under an embodiment.

FIG. 10 illustrates a crossover that combines upward-firing and front-firing speaker crossover filter networks for use with different high-frequency drivers, under an embodiment. Diagram 1000 illustrates an embodiment in which separate crossovers are provided for the front-firing speaker and the virtual height speaker. The front firing speaker crossover 1012 comprises a low-pass filter 1016 that feeds low-frequency driver 1020 and a high-pass filter 1014 that feeds high-frequency driver 1018. The virtual height speaker crossover 1002 includes a low-pass filter 1004 that also feeds low-frequency driver 1020 through combination with the output of low-pass filter 1016 in crossover 1012. The virtual height crossover 1002 includes a high-pass filter 1006 that incorporates virtual height filter function 1008. The output of this component 1007 feeds high frequency driver 1010. Driver 1010 is an upward-firing driver and is typically a smaller and possibly different composition driver than the front-firing high-frequency driver 1018.

There are several benefits from combining the crossover networks for the top and forward firing speakers as shown in FIG. 10. First, the preferred smaller driver 1010 will not be able to effectively reproduce lower frequencies and may actually distort at loud levels. Therefore filtering and redirecting the low frequencies to the front firing speaker's low frequency drivers will allow the smaller single speaker to be used for the virtual height speaker and result in greater fidelity. Additionally, research has shown that there is little virtual height effect for audio signals below 400 Hz, so sending only higher frequencies to the virtual height speaker 1010 represents an optimum use of that driver.

As shown in FIG. 1, the reflection of sound to the desired listening position 106 depends on the reflection point 104 of the sound waves off the ceiling 102. Depending on the configuration and characteristics of the upward-firing driver 110, the reflection spot 104 may be a sharply defined point or a broadly defined area. In general, the driver 110 may be configured to be as directional as possible given a well-defined listening position 106. In general, the optimal angle for an upward firing speaker is the inclination angle of the virtual height driver that maximizes the ratio of reflected energy to direct energy to the listening position 106. This angle defines the location of reflection spot 104, and is a function of distance from the speaker, the radiation pattern of the speaker, and the ceiling height. In an embodiment, the inclination angle of the virtual height speaker may be changed, either automatically or manually, to direct the reflected signal to different listening positions. For an embodiment in which speaker movement is automated, certain positional information regarding either the listening position 106 distance from the speaker or the reflection point 104 position may be transmitted back to the renderer or speaker to control the inclination angle. Depending on implementation of the control circuitry (e.g., either analog, digital, or electromechanical), such positional information can be provided through electrical signaling methods, electromechanical means, or other similar mechanisms.

In an embodiment, the control component may also be configured to change the virtual height model implemented by the upward-firing speaker depending on the inclination angle. In this embodiment, the scaling factor may be changed, or the filter curve 302 that is applied to the reflected sound component may be changed.

Room Correction with Virtual Height Speakers

As discussed above, adding virtual height filtering to a virtual height speaker adds perceptual cues to the audio signal that add or improve the perception of height to upward-firing speakers. Incorporating virtual height filtering techniques into speakers and/or renderers may need to account for other audio signal processes performed by playback equipment. One such process is room correction, which is a process that is common in commercially available AVRs. Room correction techniques utilize a microphone placed in the listening environment to measure the time and frequency response of audio test signals played back through an AVR with connected speakers. The purpose of the test signals and microphone measurement is to measure and compensate for several key factors, such as the acoustical effects of the room and environment on the audio (including room nodes (nulls and peaks), non-ideal frequency response of the playback speakers, time delays between multiple speakers and the listening position, and other similar factors. Automatic frequency equalization and/or volume compensation may be applied to the signal to overcome any effects detected by the room correction system. For example, for the first two factors, equalization is typically used to modify the audio played back through the AVR/speaker system, in order to adjust the frequency response magnitude of the audio so that room nodes (peaks and notches) and speaker response inaccuracies are corrected.

If virtual height speakers are used in the system and virtual filtering is enabled, a room correction system may detect the virtual height filter as a room node or speaker anomaly and attempt to equalize the virtual height magnitude response to be flat. This attempted correction is especially noticeable if the virtual height filter exhibits a pronounced high frequency notch, such as when the inclination angle is relatively high, such as shown in plots 912 and 914 of FIG. 9.

Figure 11:
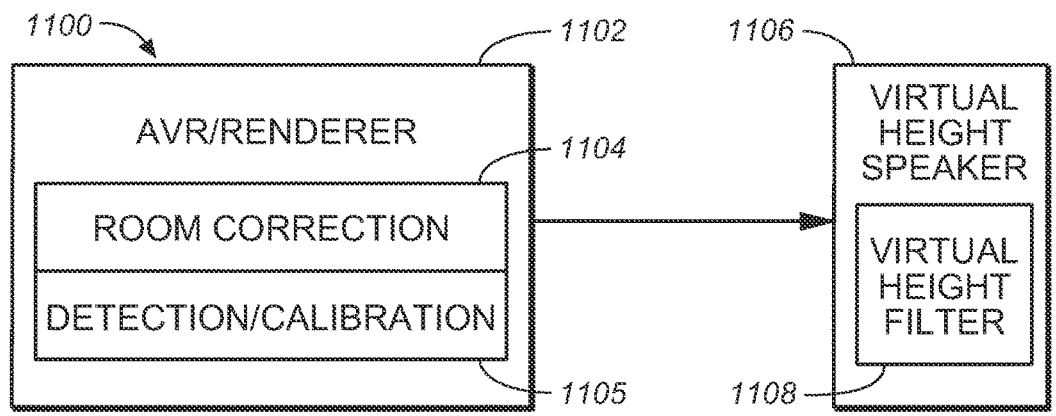
FIG. 11 is a block diagram of a virtual height rendering system that includes room correction and virtual height speaker detection capabilities, under an embodiment.

Embodiments of a virtual height speaker system include techniques and components to prevent a room correction system from undoing the virtual height filtering. FIG. 11 is a block diagram of a virtual height rendering system that includes room correction and virtual height speaker detection capabilities, under an embodiment. As shown in diagram 1100, an AVR or other rendering component 1102 is connected to one or more virtual height speakers 1106 that incorporates a virtual height filter process 1108. This filter produces a frequency response, such as illustrated in FIG. 7, which may be susceptible to room correction 1104 or other anomaly compensation techniques performed by renderer 1102.

In an embodiment, the room correction compensation component includes a component 1105 that allows the AVR or other rendering component to detect that a virtual height speaker is connected to it. One such detection technique is the use of a room calibration user interface and a speaker definition that specifies a type of speaker as a virtual or non-virtual height speaker. Present audio systems often include an interface that ask the user to specify the size of the speaker in each speaker location, such as small, medium, large. In an embodiment, a virtual height speaker type is added to this definition set. Thus, the system can anticipate the presence of virtual height speakers through an additional data element, such as small, medium, large, virtual height, etc. In an alternative embodiment, a virtual height speaker may include signaling hardware that states that it is a virtual height speaker as opposed to a non-virtual height speaker. In this case, a rendering device (such as an AVR) could probe the speakers and look for information regarding whether any particular speaker incorporates virtual height technology. This data could be provided via a defined communication protocol, which could be wireless, direct digital connection or via a dedicated analog path using existing speaker wire or separate connection. In a further alternative embodiment, detection can be performed through the use of test signals and measurement procedures that are configured or modified to identify the unique frequency characteristics of a virtual height filter in a speaker and determine that a virtual height speaker is connected via analysis of the measured test signal.

Once a rendering device with room correction capabilities has detected the presence of a virtual height speaker (or speakers) connected to the system, a calibration process 1105 is performed to correctly calibrate the system without adversely affecting the virtual height filtering function 1108. In one embodiment, calibration can be performed using a communication protocol that allows the rendering device to have the virtual height speaker 1106 bypass the virtual height filtering process 1108. This could be done if the speaker is active and can bypass the filtering. The bypass function may be implemented as a user selectable switch, or it may be implemented as a software instruction (e.g., if the filter 1108 is implemented in a DSP), or as an analog signal (e.g., if the filter is implemented as an analog circuit).

Figure 12:
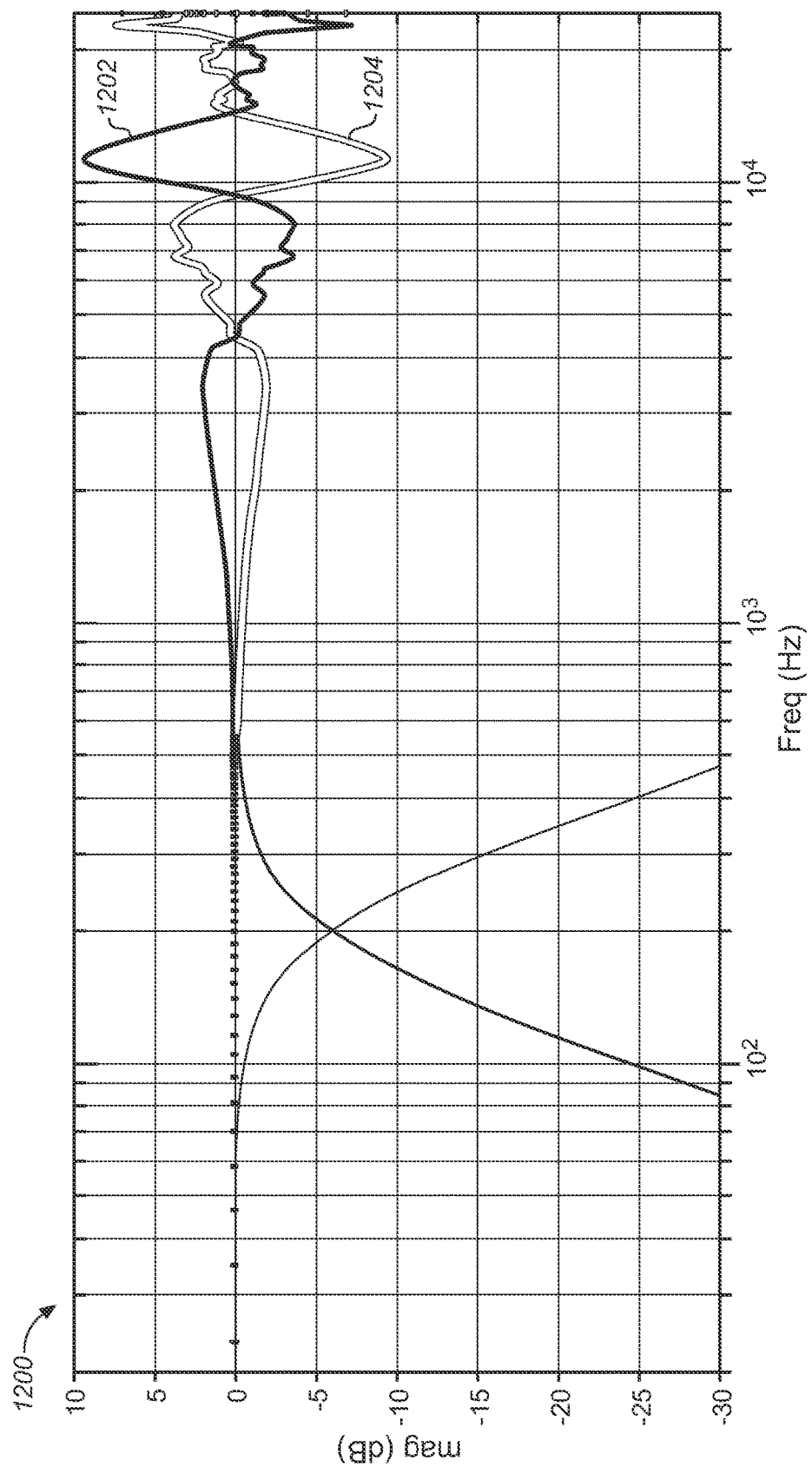
FIG. 12 is a graph that displays the effect of pre-emphasis filtering for calibration, under an embodiment.

In an alternative embodiment, system calibration can be performed using pre-emphasis filtering. In this embodiment, the room correction algorithm 1104 performs pre-emphasis filtering on the test signal it generates and outputs to the speakers for use in the calibration process. FIG. 12 is a graph that displays the effect of pre-emphasis filtering for calibration, under an embodiment. Plot 1200 illustrates a typical frequency response for a virtual height filter 1204, and a complimentary pre-emphasis filter frequency response 1202. The pre-emphasis filter is applied to the audio test signal used in the room calibration process, so that when played back through the virtual height speaker, the effect of the filter is cancelled, as shown by the complementary plots of the two curves 1202 and 1204 in the upper frequency range of plot 1200. In this way, calibration would be applied as if using a normal, non-virtual height speaker.

In yet a further alternative embodiment, calibration can be performed by adding the pre-emphasis filter response to the target response of the calibration system.

Figure 13:
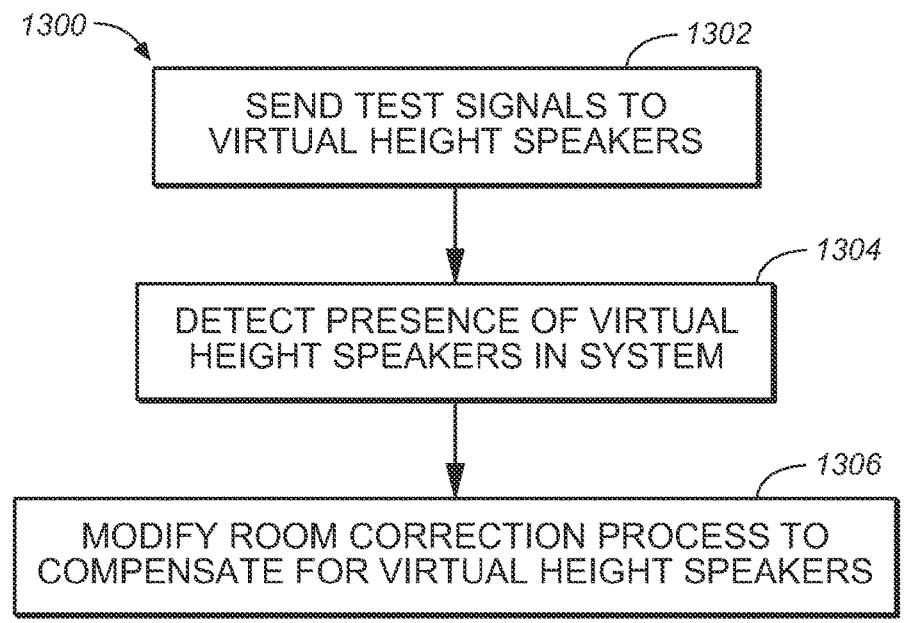
FIG. 13 is a flow diagram illustrating a method of performing virtual height filtering in an adaptive audio system, under an embodiment.

FIG. 13 is a flow diagram illustrating a method of performing virtual height filtering in an adaptive audio system, under an embodiment. The process of FIG. 13 illustrates the functions performed by the components shown in FIG. 11. Process 1300 starts by sending a test signal or signals to the virtual height speakers with built-in virtual height filtering, act 1302. The built-in virtual height filtering produces a frequency response curve, such as that shown in FIG. 7, which may be seen as an anomaly that would be corrected by any room correction processes. In act 1304, the system detects the presence of the virtual height speakers, so that any modification due to application of room correction methods may be corrected or compensated to allow the operation of the virtual height filtering of the virtual height speakers, act 1306.

As described above and illustrated in FIG. 4B, the virtual height filter may be implemented with or as part of a crossover circuit that separates input audio frequencies into high and low bands, or more depending on the crossover design. This combined circuit may be implemented as a digital DSP circuit or other circuit that implements an FIR (finite impulse response) or IIR (infinite impulse response) filter to approximate the virtual height filter curve, such as shown in FIG. 3. Either of the crossover and/or virtual height filter may be implemented as passive or active circuits, wherein an active circuit requires a separate power supply to function, and a passive circuit uses power provided by other system components or signals.

Figure 14:
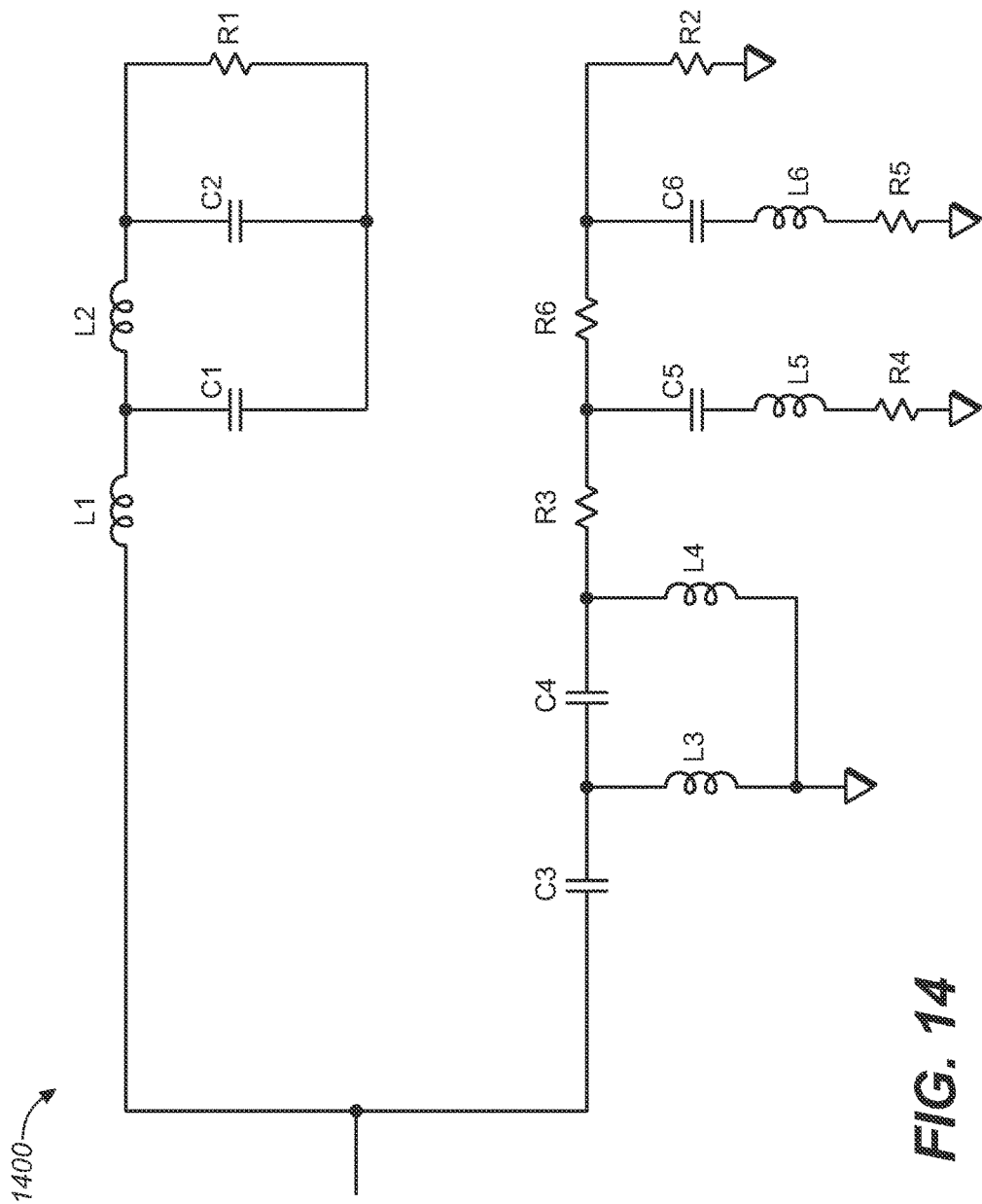
FIG. 14 is a circuit diagram illustrating an analog virtual height filter circuit and crossover, under an embodiment.

For an embodiment in which the crossover/filter 422 is provided as part of a speaker system 426 (cabinet plus drivers), this component may be implemented in an analog circuit. FIG. 14 is a circuit diagram illustrating an analog virtual height filter circuit and crossover, under an embodiment. Circuit 1400 includes a crossover portion and a virtual height filter portion both comprising a connection of analog components. The values and characteristics of the various components (resistors, capacitors, inductors) may be selected according to design principles known to those of ordinary skill in the art. The example circuit 1400 of FIG. 14 is meant to represent just one example of a possible circuit design or layout for a crossover/virtual height filter circuit, and other designs are possible.

The speakers used in an adaptive audio system that implements virtual height filtering for a home theater or similar listening environment may use a configuration that is based on existing surround-sound configurations (e.g., 5.1, 7.1, 9.1, etc.). In this case, a number of drivers are provided and defined as per the known surround sound convention, with additional drivers and definitions provided for the upward-firing sound components.

Figure 15:
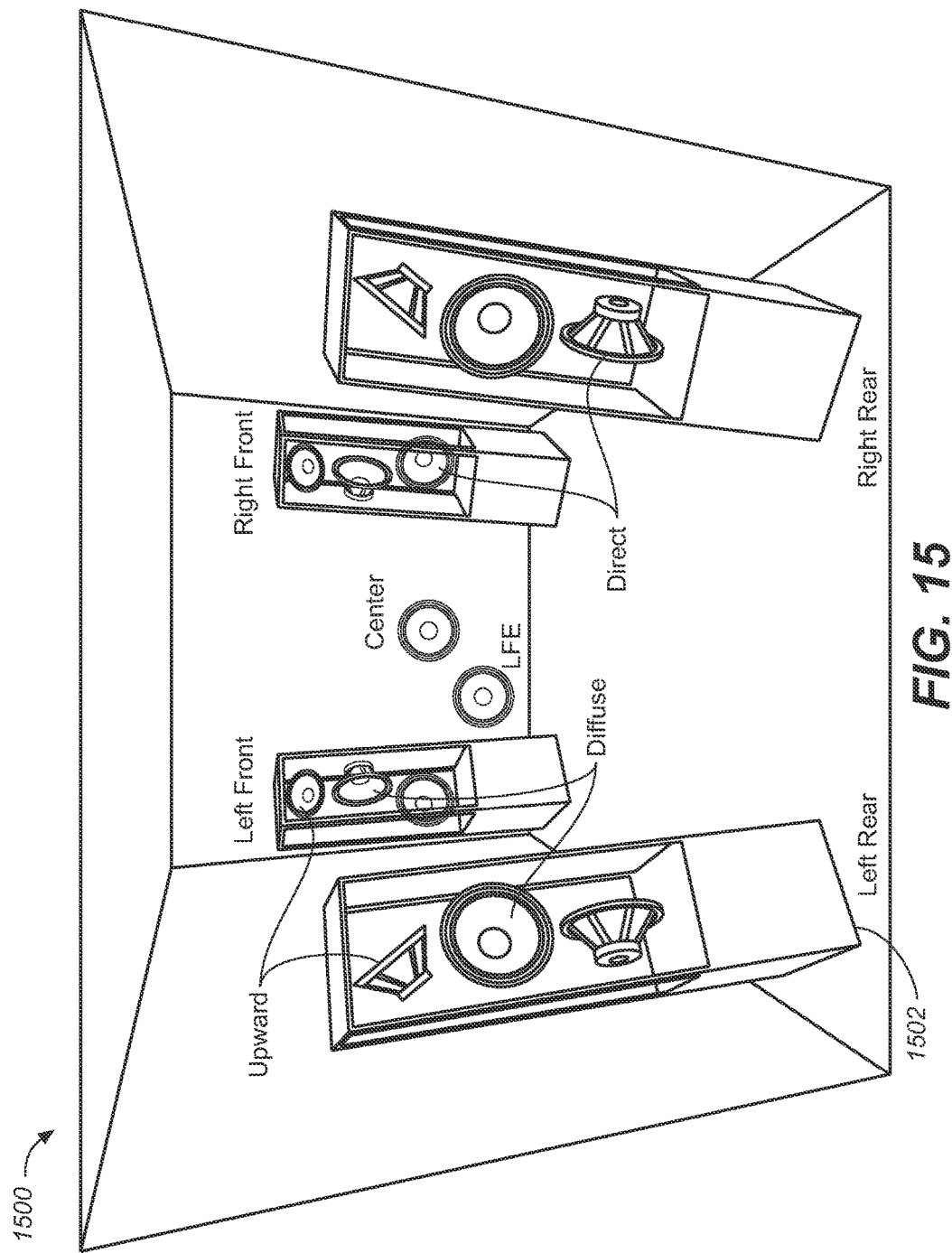
FIG. 15 illustrates an example placement of speakers having upward-firing drivers and virtual height filter components within a listening environment.

In a typical adaptive audio environment, a number of speaker enclosures will be contained within the listening environment. FIG. 15 illustrates an example placement of speakers having upward-firing drivers and virtual height filter components within a listening environment. As shown in FIG. 15, listening environment 1500 includes four individual speakers 1502, each having at least one front-firing, side-firing, and upward-firing driver. The listening environment may also contain fixed drivers used for surround-sound applications, such as center speaker and subwoofer or LFE (low-frequency element). As can be seen in FIG. 8, depending on the size of the listening environment and the respective speaker units, the proper placement of speakers 1502 within the listening environment can provide a rich audio environment resulting from the reflection of sounds off the ceiling from the number of upward-firing drivers. The speakers can be aimed to provide reflection off of one or more points on the ceiling plane depending on content, listening environment size, listener position, acoustic characteristics, and other relevant parameters.

As stated previously, the optimal angle for an upward firing speaker is the inclination angle of the virtual height driver that results in maximal reflected energy on the listener. In an embodiment, this angle is a function of distance from the speaker and ceiling height. While generally the ceiling height will be the same for all virtual height drivers in a particular room, the virtual height drivers may not be equidistant from the listener or listening position 106. For an embodiment such as shown in FIG. 15, the virtual height speakers may be used for different functions, such as direct projection and surround sound functions. In this case, different inclination angles for the upward firing drivers may be used. For example, the surround virtual height speakers may be set at a shallower or steeper angle as compared to the front virtual height drivers depending on the content and room conditions. Furthermore, different α scaling factors may be used for the different speakers, e.g., for the surround virtual height drivers versus the front height drivers. Likewise, a different shape magnitude response curve may be used for the virtual height model 302 that is applied to the different speakers. Thus, in a deployed system with multiple different virtual height speakers, the speakers may be oriented at different angles and/or the virtual height filters for these speakers may exhibit different filter curves.

The upward-firing speakers incorporating virtual height filtering techniques can be used to reflect sound off of a hard ceiling surface to simulate the presence of overhead/height speakers positioned in the ceiling. A compelling attribute of the adaptive audio content is that the spatially diverse audio is reproduced using an array of overhead speakers. As stated above, however, in many cases, installing overhead speakers is too expensive or impractical in a home environment. By simulating height speakers using normally positioned speakers in the horizontal plane, a compelling 3D experience can be created with easy to position speakers. In this case, the adaptive audio system is using the upward-firing/height simulating drivers in a new way in that audio objects and their spatial reproduction information are being used to create the audio being reproduced by the upward-firing drivers. The virtual height filtering components help reconcile or minimize the height cues that may be transmitted directly to the listener as compared to the reflected sound so that the perception of height is properly provided by the overhead reflected signals.

Figure 16A:
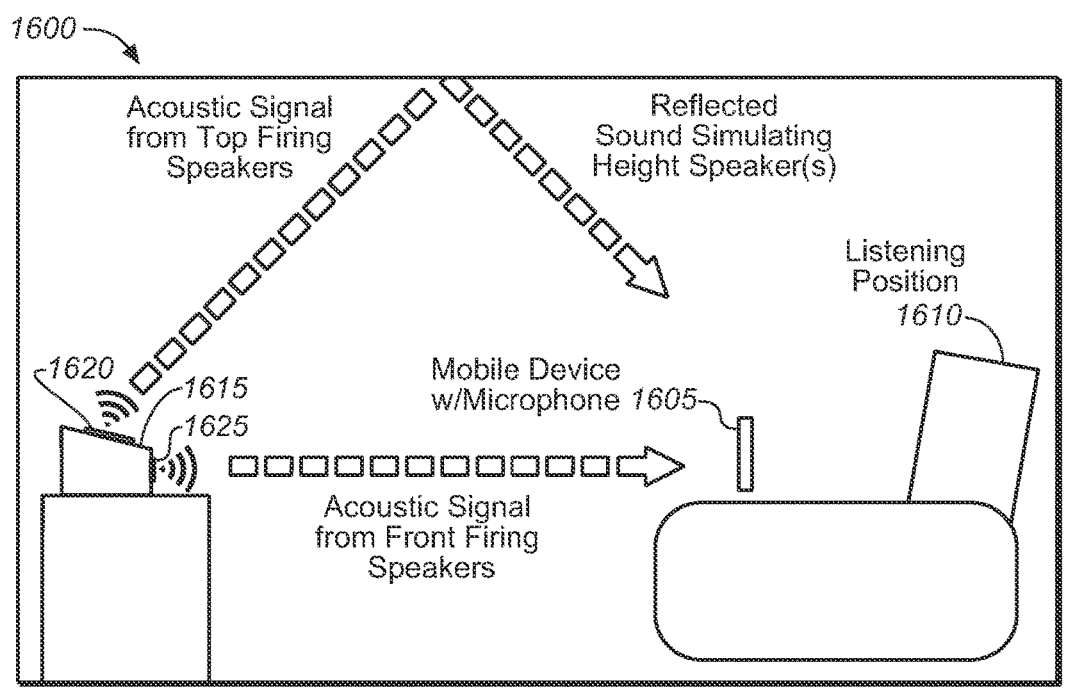
FIG. 16A illustrates an example placement of top-firing speakers, front-firing speakers and a mobile device within a listening environment.

FIG. 16A illustrates an example placement of top-firing speakers, front-firing speakers and a mobile device within a listening environment. In this example, an audio system 1615 within the listening environment 1600 includes at least one top-firing speaker 1620 and at least one front-firing speaker 1625. Some implementations may include an adaptive audio renderer, an amplifier, etc., as described above (see, e.g., FIGS. 4A-4C and 11, and the associated text). Although one or more of these features may be part of the audio system 1615, these features are not illustrated in FIG. 16A.

In this implementation, the audio system 1615 is capable of controlling the top-firing speaker 1620 to function as a virtual height speaker. For example, the top-firing speaker 1620 may include a virtual height filter component, such as the virtual height filter component 436 shown in FIG. 4C and described above. In some such implementations, the top-firing speaker 1620 may be a dedicated virtual height speaker, like speaker 438 of FIG. 4C, and the front-firing speaker 1625 may be a legacy speaker.

Alternatively, another component of the audio system 1615 may include virtual height filtering functionality. For example, an adaptive audio renderer, such as the adaptive audio renderer shown in FIG. 4A, may include virtual height filtering functionality. In some implementations, an AVR, a sound bar, a sound dock, a "home theater in a box" (HTiB) and/or another component of the audio system 1615 may include virtual height filtering functionality. In some implementations having integrated top-firing and front-firing speakers, such as the virtual height speakers 406 and 426 shown in FIGS. 4A and 4B, respectively, the integrated speaker may include virtual height filtering and/or crossover functionality.

Currently, most home theater systems include amplification and speakers that can be measured and calibrated using dedicated calibration microphones and software that are included with the home theater product. A calibration microphone may be used to measure the time and/or frequency response of the system in a listening environment (for example, in a living room) and the results may be used to improve the playback characteristics (time delay, filtering, etc.) of the system.

This approach, while generally satisfactory, has some limitations. For example, a certain level of quality is required of the calibration microphone in such implementations. The calibration microphone may need to have a flat or controlled frequency response, low distortion, etc.

If the home theater system includes one or more virtual height speakers, or stand-alone speakers that implement virtual height technology, the process of calibrating the speakers may be more complex. Virtual height speakers have been designed to operate in a wide range of environments, in which ceiling heights may vary substantially and in which ceiling materials (drywall, paint, plaster, wood, etc.) may have varying amounts of acoustic reflectivity. The calibration of a virtual height speaker may take into account and correct for the frequency response of the transducer(s), the time delay difference between the top firing and front firing speakers and acoustic power losses due to the height of the ceiling and the reflectivity of the ceiling material.

Accordingly, adding virtual height speaker calibration hardware, in addition to the signal processing capabilities required for speaker calibration, may add to the complexity and to the manufacturing costs of the system. Including virtual height speaker calibration hardware and software to constrained cost devices, such as a soundbar or a stand-alone virtual height speaker, may not be practical.

Therefore, in some implementations described herein, at least part of the speaker calibration process, such as determining whether and how to adjust the gain of the top-firing speaker(s)) to compensate for ceiling height and/or ceiling acoustic reflectivity, may be done using a mobile device (a smart phone, a tablet, etc.) running a novel mobile device application on a mobile operating system (iOS, Android, etc.). For example, the mobile device application may be a dedicated speaker calibration app that can be used in conjunction with compatible hardware, such as a soundbar. An un-calibrated or minimally calibrated microphone, of the type typically found in a mobile device such as a smart phone or a tablet, may be used to provide input for such speaker calibration processes.

Accordingly, in the example shown in FIG. 16A, a mobile device 1605 is positioned at or near a listening position 1610 within the listening environment 1600. Examples of mobile device components are described below. The mobile device 1605 may be capable of performing, at least in part, the speaker calibration methods described herein.

Figure 16B:
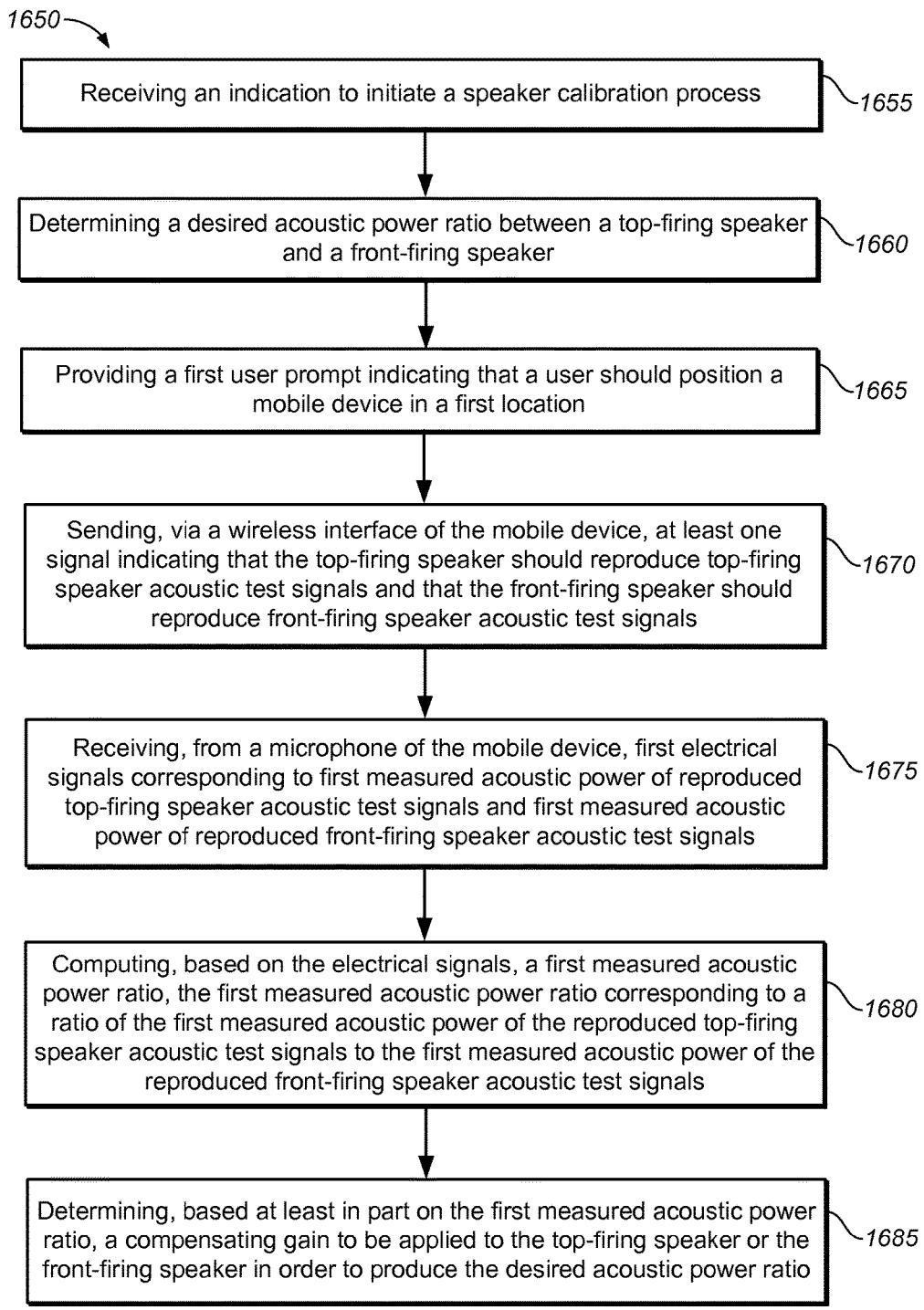
FIG. 16B is a flow diagram that outlines an example of a speaker calibration method involving a mobile device.

FIG. 16B is a flow diagram that outlines an example of a speaker calibration method involving a mobile device. The processes of method 1650 may be performed, at least in part, by a control system of the mobile device. As with other methods described herein, the blocks of method 1650 are not necessarily performed in the order indicated. Alternative implementations of the methods described herein may include more or fewer blocks.

In this example, method 1650 begins with block 1655, which involves receiving an indication to initiate a speaker calibration process. In some examples, block 1655 may involve receiving the indication via user input to a mobile device. For example, a user may provide input via a touch screen, by voice commands via a microphone, via a gesture recognition system, via a keypad, a button, etc.

Figure 17A:
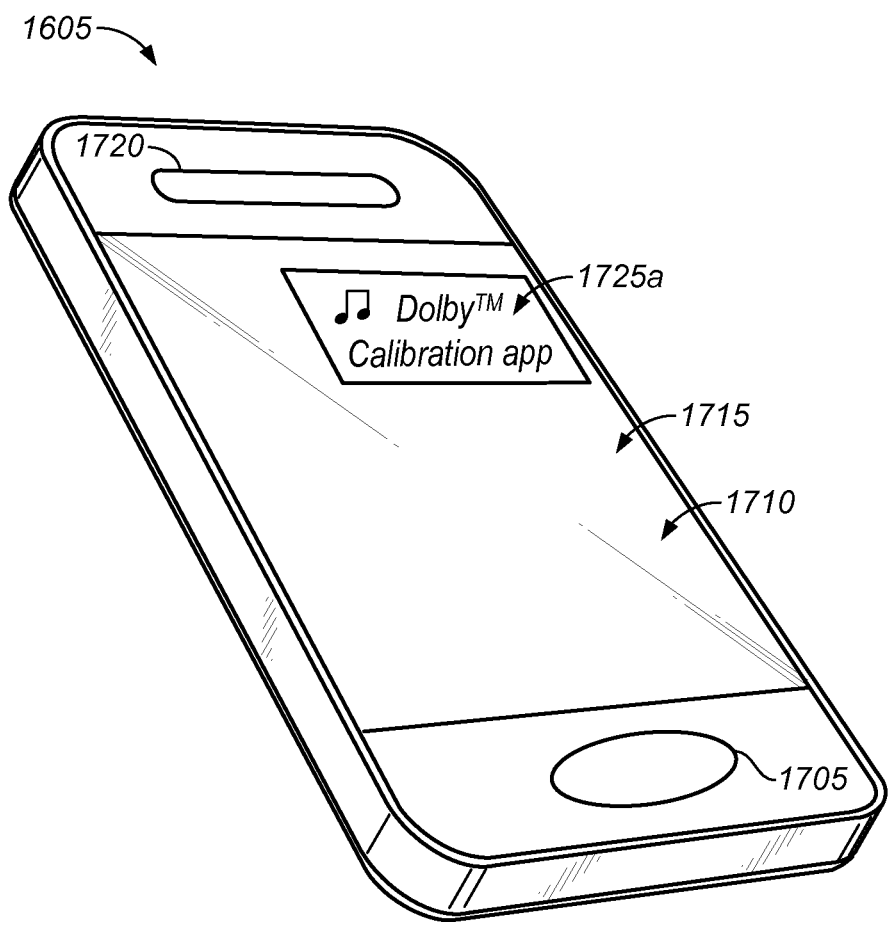
FIGS. 17A through 17C show examples of mobile device displays at various stages during an implementation of the method of FIG. 16.
Figure 17B:
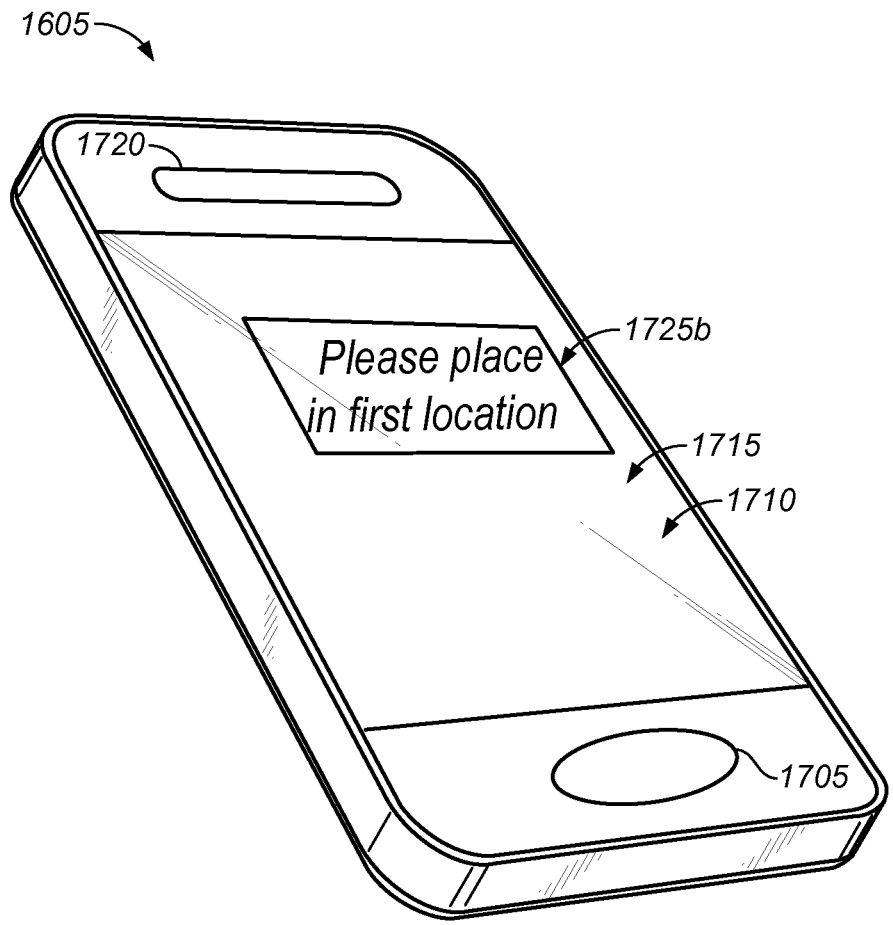
Figure 17C:
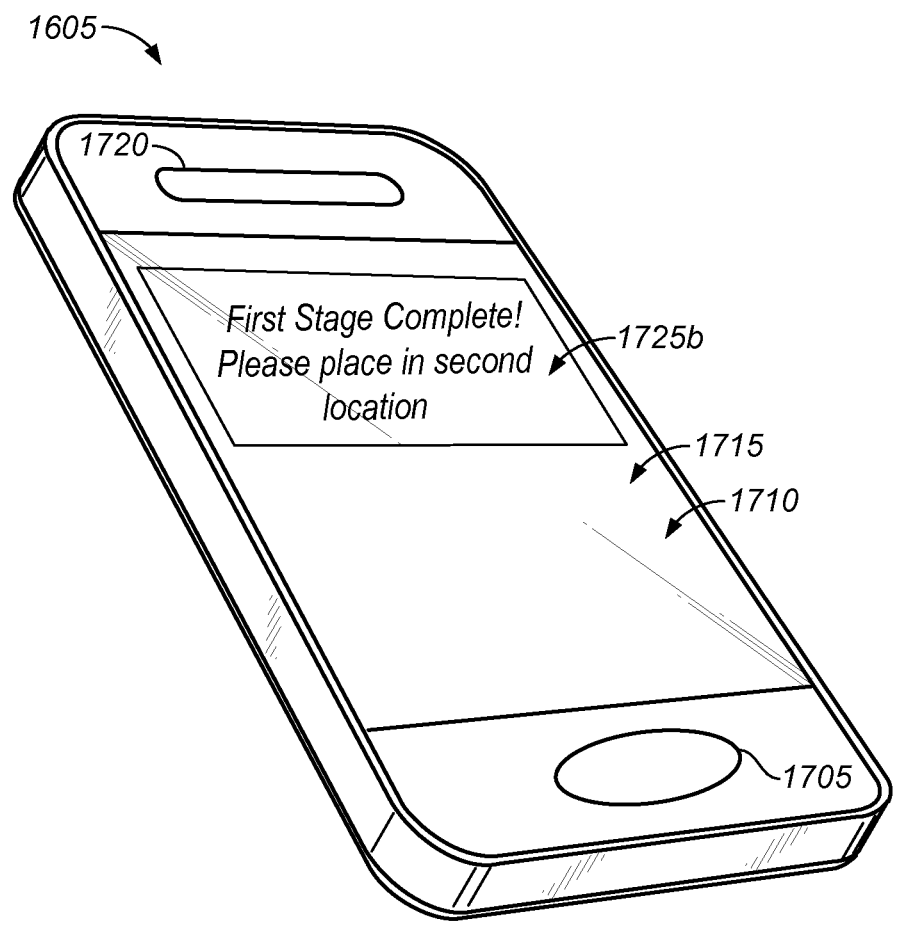

FIGS. 17A through 17C show examples of mobile device displays at various stages during an implementation of the method of FIG. 16. Referring first to FIG. 17A, in this example the mobile device 1605 includes a microphone 1705, a speaker 1720 and a display 1710. In this implementation, the mobile device 1605 has a touch sensor system, which includes a touch screen 1715 overlying the display 1710.

At the moment depicted by FIG. 17A, a control system of the mobile device 1605 is controlling the display 1710 to display an image of an icon corresponding to a speaker calibration application or "app" in area 1725a. If a user touches the area 1725a, the control system may receive an indication of the user's touch via the touch sensor system and may therefore begin executing software corresponding to the app. Accordingly, in some examples, block 1655 may involve detecting a user's touch in an area of the display 1710 corresponding to a speaker calibration app.

However, block 1655 may involve receiving an indication to initiate the speaker calibration process in a different manner. For example, block 1655 may involve receiving the indication via another interface, such as a wireless interface of the mobile device 1605. The indication may, for example, be received from a component of the audio system 1615. In some such implementations, the indication may be received from a component of the audio system 1615 when a virtual speaker system is first connected to other devices in the audio system 1615 and powered on.

In the example shown in FIG. 16B, block 1660 involves determining a desired acoustic power ratio between a top-firing speaker and a front-firing speaker. The desired acoustic power ratio may, for example, be a product-specific desired acoustic power ratio that is determined during the design or manufacturing of a speaker product, such as a stand-alone virtual height speaker, a soundbar that includes a virtual height speaker, etc. For example, in some implementations the desired acoustic power ratio may be represented as follows:

$$\text{Desired Acoustic Power Ratio} = \frac{\text{Acoustic Power Top Firing Speaker factory}}{\text{Acoustic Power Front Firing factory}}$$

Accordingly, in some implementations block 1660 may involve receiving speaker product information and obtaining, from a data structure stored in a memory, a product-specific desired acoustic power ratio corresponding to the speaker product information. The speaker product information may be received via an interface of the mobile device, which may be a user interface, a wireless interface, a port (such as a universal serial bus (USB) port), etc. In some implementations, block 1660 may involve obtaining the product-specific desired acoustic power ratio from a memory of the mobile device. Alternatively, block 1660 may involve obtaining the product-specific desired acoustic power ratio from a memory of another device, via an interface of the mobile device. The interface may be a wireless interface, a user interface or a port of the mobile device.

In some implementations, block 1660 may involve determining a default desired acoustic power ratio. For example, a default desired acoustic power ratio, not associated with any particular speaker product, may be determined in block 1660. In some implementations, the default desired acoustic power ratio may be 1, such that the desired acoustic power ratio is to have the acoustic power ratio of the top-firing speaker be substantially equal to that of the front-firing speaker.

In this example, block 1665 involves providing a first user prompt indicating that a user should position a mobile device in a first location. The first location may be at or near a position within a listening environment at which the user expects one or more listeners to be located while listening to an audio system 1615 that includes the virtual height speaker, such as the listening position 1610 shown in FIG. 16A. The user prompt may, for example, be made via a display of the mobile device and/or via a speaker of the mobile device. One example is shown in FIG. 17B, in which a visual prompt is made in area 1725b of the display 1710. In some implementations, additional visual prompts and/or audio prompts may provide more detailed guidance regarding where to position the mobile device, to advise the user to avoid moving the mobile device and to keep the listening environment quiet during the speaker calibration process, etc.

In the example shown in FIG. 16B, block 1670 involves sending, via a wireless interface of the mobile device, at least one signal indicating that the top-firing speaker should reproduce top-firing speaker acoustic test signals and that the front-firing speaker should reproduce front-firing speaker acoustic test signals. The signal(s) sent in block 1670 may indicate that the front-firing and top-firing speakers should reproduce the acoustic test signals at separate times. Block 1670 may involve sending signals to a control system of an audio system. Depending on the implementation, the signals of block 1670 may be sent to a control system of an AVR, a sound bar, a sound dock, an HTiB and/or another component of an audio system. In some implementations, at least a portion of the control system may be incorporated in a virtual height speaker. In such implementations, block 1670 may involve sending signals directly or indirectly to the virtual height speaker.

In some implementations, the signal(s) sent in block 1670 may indicate that one general type of acoustic test signals, such as tones, pink noise, red noise, grey noise or another type of acoustic test signal should be reproduced. However, in alternative implementations, the signal(s) sent in block 1670 may indicate that two or more types of acoustic test signals should be reproduced. In some such implementations, the signal(s) sent in block 1670 may indicate that the acoustic test signals should include pink noise and tones.

In some implementations, the signal(s) sent in block 1670 may indicate that the front-firing and/or top-firing speakers, or another component of the audio system, should provide test signal differentiating information to the mobile device, to allow the mobile device to differentiate reproduced top-firing speaker acoustic test signals from reproduced front-firing speaker acoustic test signals. The test signal differentiating information may be provided to the mobile device via acoustic signals, wireless signals, etc. In some implementations, the test signal differentiating information may indicate a type of acoustic test signal, a frequency band for an acoustic test signal and/or other test signal differentiating information. In some implementations, the test signal differentiating information may indicate which virtual speaker, among multiple virtual speakers in a listening environment, is reproducing the acoustic test signals.

The reproduced acoustic test signals may be received by a microphone of the mobile device. The microphone may send corresponding electrical signals to a control system of the mobile device. Accordingly, block 1675 may involve receiving, from a microphone of the mobile device, electrical signals corresponding to measured acoustic power of reproduced top-firing speaker acoustic test signals. These electrical signals are referred to herein as "corresponding to measured acoustic power" because such electrical signals may be used to compute the measured acoustic power. It will be appreciated that electrical signals from the microphone are not necessarily, in themselves, the measured acoustic power. In this example, block 1675 also involves receiving, from the microphone, electrical signals corresponding to measured acoustic power of reproduced front-firing speaker acoustic test signals. In FIG. 16B, the electrical signals are referred to as "first" electrical signals corresponding to "first" measured acoustic power of the reproduced acoustic test signals. Some implementations may involve receiving two or more such electrical signals corresponding to two or more stages of a speaker calibration process. Some examples are described below. However, in other implementations, the first stage of the speaker calibration process is the only stage of the speaker calibration process.

The control system may be capable of differentiating the electrical signals corresponding to measured acoustic power of reproduced top-firing speaker acoustic test signals from the electrical signals corresponding to measured acoustic power of reproduced front-firing speaker acoustic test signals. In some examples, such signals may be differentiated according to test signal differentiating information received by the mobile device. In other examples, the mobile device may differentiate the test signals based on a predetermined time interval during which the test signals will be reproduced by each speaker, by detecting a pattern in the reproduced test signals, according to information provided by the speaker calibration app, or on some other appropriate basis.

In the example shown in FIG. 16B, block 1680 involves computing, based on the electrical signals, a first measured acoustic power ratio. In this implementation, the first measured acoustic power ratio corresponds to a ratio of the first measured acoustic power of the reproduced top-firing speaker acoustic test signals to the first measured acoustic power of the reproduced front-firing speaker acoustic test signals. In some implementations, a measured acoustic power ratio may be represented as follows:

$$\text{Measured Acoustic Power Ratio} = \frac{\text{Acoustic Power Top Firing Speaker measured}}{\text{Acoustic Power Front Firing Speaker measured}}$$

Here, block 1685 involves determining, based at least in part on the first measured acoustic power ratio, a compensating gain to be applied to the top-firing speaker or the front-firing speaker in order to produce the desired acoustic power ratio. In some implementations, a compensating gain to be applied to the top-firing speaker may be determined as follows:

$$\text{Top Firing Speaker Compensation Gain} = \frac{\text{Desired Acoustic Power Ratio}}{\text{Measured Acoustic Power Ratio}}$$

As described in more detail elsewhere herein, there may or may not be additional stages of the speaker calibration process. Accordingly, one or more additional measured acoustic power ratios may or may not be determined, depending on the particular implementation. Therefore, in some implementations the compensating gain may be based on a single measured acoustic power ratio. In some such implementations, the compensating gain may be a broadband compensating gain. However, in other implementations the compensating gain may be based on two or more measured acoustic power ratios. Some examples are described below.

After the compensating gain is determined, the method may involve sending, via the wireless interface of the mobile device, a compensating gain signal corresponding to the compensating gain. The compensating gain signal may be sent to a control system of an audio system. Depending on the implementation, the compensating gain signal may be sent to a control system of an AVR, a sound bar, a sound dock, an HTiB and/or another component of an audio system. The control system of the audio system may be capable of adjusting the gain of the top-firing speaker or the front-firing speaker, according to the compensating gain signal, in order to produce the desired acoustic power ratio.

As noted above, some implementations involve multiple stages of the speaker calibration process. These stages may, for example, correspond to mobile device locations, test signal frequency bands, multiple virtual height speakers, or other criteria. Whether or not the speaker calibration process involves involve multiple stages, in some implementations the mobile device may only be placed in a single location during a speaker calibration process.

For example, if multiple stages of the speaker calibration process correspond to different test signal frequency bands used to calibrate a single virtual height speaker, the mobile device may remain in a single location during the speaker calibration process. In some such implementations, the compensating gain may be a frequency-dependent compensating gain. The "first electrical signals" of block 1675 may correspond to first measured acoustic power of a first frequency band. Such speaker calibration methods may involve determining (e.g., by a control system of the mobile device) that a first stage of the speaker calibration process has concluded. Such a determination may be made, for example, upon completion of block 1680 and/or block 1685 of method 1650 for a first frequency band.

Such implementations also may involve receiving, from the microphone of the mobile device, second electrical signals corresponding to second measured acoustic power of the reproduced top-firing speaker acoustic test signals in a second frequency band and second measured acoustic power of the reproduced front-firing speaker acoustic test signals in the second frequency band.

Such methods may involve computing, based on the electrical signals, a second measured acoustic power ratio. The second measured acoustic power ratio may correspond to a ratio of the second measured acoustic power of the reproduced top-firing speaker acoustic test signals to the second measured acoustic power of the reproduced front-firing speaker acoustic test signals. Such methods also may involve determining, based at least in part on the second measured acoustic power ratio, a second frequency-dependent compensating gain for the second frequency band.

In some implementations, the mobile device may remain in a single location during a multi-stage process of calibrating multiple virtual height speakers. Such speaker calibration methods may involve determining that a first stage of the speaker calibration process has concluded. Such a determination may be made, for example, upon completion of block 1675, block 1680 and/or block 1685 of method 1650 for a first virtual height speaker.

The speaker calibration process may involve sending, via the wireless interface of the mobile device, at least one signal indicating that a second top-firing speaker should reproduce the top-firing speaker acoustic test signals and that a second front-firing speaker should reproduce the front-firing speaker acoustic test signals for a second stage of the speaker calibration process. The process may involve receiving, from the microphone of the mobile device, second electrical signals corresponding to second measured acoustic power of the top-firing speaker acoustic test signals reproduced by the second top-firing speaker and second measured acoustic power of the front-firing speaker acoustic test signals reproduced by the second front-firing speaker. The process may involve computing, based on the electrical signals, a second measured acoustic power ratio. The second measured acoustic power ratio may corresponding to a ratio of the second measured acoustic power of the reproduced top-firing speaker acoustic test signals to the second measured acoustic power of the reproduced front-firing speaker acoustic test signals. The process may involve determining, based at least in part on the second measured acoustic power ratio, a compensating gain to be applied to the second top-firing speaker or the second front-firing speaker in order to produce the desired acoustic power ratio in the second virtual height speaker.

In some instances, it may be desirable to calibrate virtual height speakers based on the acoustics of multiple locations within a listening environment. For example, the listening environment may include multiple locations in which listeners are likely to sit. Alternatively, or additionally, the distance between the floor and ceiling of the listening environment may vary in different parts of the listening environment. Some listening environments, for example, may include multi-level ceilings, such as cathedral ceilings, and/or multi-level floors.

Therefore, in alternative examples the mobile device may be placed in two or more locations during a speaker calibration process. Such speaker calibration methods may involve determining that a first stage of the speaker calibration process has concluded. Such a determination may be made, for example, upon completion of block 1675, block 1680 and/or block 1685 of method 1650 for a first mobile device location.

Some such implementations may involve providing a second user prompt indicating that the user should position the mobile device in a second location during a second stage of the speaker calibration process. The user prompt may, for example, be made via a display of the mobile device and/or via a speaker of the mobile device. One example of such a user prompt is shown in FIG. 17C. Here, the visual prompt is made in area 1725c of the display 1710. In some implementations, additional visual prompts and/or audio prompts may provide more detailed guidance regarding where to position the mobile device, etc.

In some implementations, the test signals used in the second stage of the speaker calibration process may be substantially the same as those used during the first stage of the speaker calibration process. Accordingly, such methods may involve sending, via the wireless interface of the mobile device, at least one signal indicating that the first top-firing speaker should reproduce the top-firing speaker acoustic test signals and that the first front-firing speaker should reproduce the front-firing speaker acoustic test signals for the second stage of the speaker calibration process. These methods may involve receiving, from the microphone of the mobile device, second electrical signals corresponding to second measured acoustic power of the reproduced top-firing speaker acoustic test signals and second measured acoustic power of the reproduced front-firing speaker acoustic test signals. The methods may involve computing, based on the second electrical signals, a second measured acoustic power ratio. The second measured acoustic power ratio may correspond to a ratio of the second measured acoustic power of the reproduced top-firing speaker acoustic test signals to the second measured acoustic power of the reproduced front-firing speaker acoustic test signals. These methods may involve determining the compensating gain based, at least in part, on the first measured acoustic power ratio and the second measured acoustic power ratio.

Figure 18:
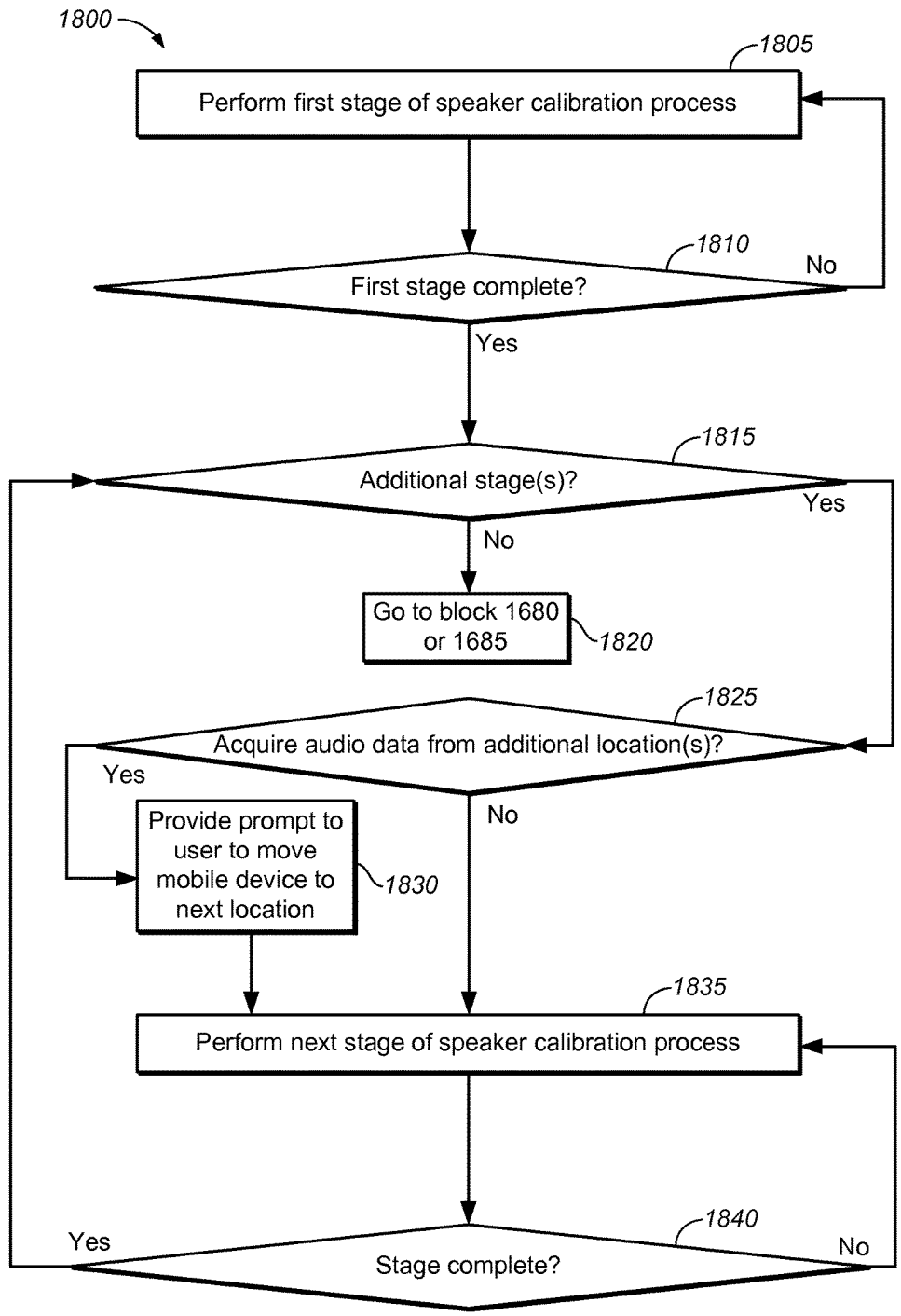
FIG. 18 is a flow diagram that outlines an example of an alternative speaker calibration method.

FIG. 18 is a flow diagram that outlines an example of an alternative speaker calibration method. Method 1800 may be performed, at least in part, by a control system of a mobile device. Method 1800 is a generalized method that may encompass some of the single-stage and multi-stage speaker calibration methods described above. In this example, block 1805 involves performing a first stage of a speaker calibration process. Block 1805 may, for example, involve completing operations similar to those of blocks 1655 through 1685 for any of the speaker calibration methods described above. For example, block 1805 may involve completing operations similar to those of blocks 1655 through 1685 for a first frequency band, for a first mobile device location, for a first virtual height speaker, for a first type of test signal, for a first top-firing or front-firing speaker, etc. Alternatively, block 1805 may involve completing operations similar to those of blocks 1655 through 1675 or blocks 1655 through 1680 for a first frequency band, for a first mobile device location, for a first virtual height speaker, for a first type of test signal, for a first top-firing or front-firing speaker, etc.

In this implementation, block 1810 involves determining whether the first stage of the speaker calibration process is complete. The determination of block 1810 will correspond with the nature of the first stage. For example, the determination of block 1810 may be made, for example, upon completion of block 1680 and/or block 1685 of method 1650 for a first virtual height speaker, for a first mobile device location, for a first frequency band, etc. In this example, if it is determined in block 1810 that the first stage of the speaker calibration process is complete, it will be determined in block 1815 whether there are any additional stages of the speaker calibration process.

As noted above, in some instances it may be advantageous to position the mobile device in more than one location in a listening environment. Therefore, if it is determined that there are additional stages of the speaker calibration process to be completed, in this example the process continues to block 1825, in which it is determined whether to acquire audio data from additional locations. If it is determined in block 1825 that audio data does not need to be acquired from additional locations, at least at the present time, in this example the next stage of the speaker calibration process will be performed (block 1835) with the mobile device in the same location.

However, if it is determined in block 1825 that audio data should be acquired from additional locations, in this implementation a prompt will be provided to a user, in block 1830, to move the mobile device to move the mobile device to the next location. As noted above, the prompt may be made in one or more ways, such as via audio or visual means. In some implementations, block 1830 may involve providing a visual prompt on a display of the mobile device, e.g., such as that shown in FIG. 17C. In some implementations, additional information may be presented to a user, e.g., upon selection of an information icon presented on a display of the mobile device. For example, a brief video may provide suggestions for placement of the mobile device in one or more types of listening environments. In some implementations, a control system of the mobile device may obtain data from one or more motion sensors, such as gyroscopes and/or accelerometers, to determine whether the mobile device has been moved. If not, one or more additional user prompts may be provided.

Whether or not it is determined in block 1825 that audio data should be acquired from additional locations, in this example the next stage of the speaker calibration process is performed in block 1835. Block 1835 may involve completing operations similar to those of blocks 1655 through 1675, blocks 1655 through 1680 or blocks 1655 through 1685 for any of the speaker calibration methods described above. For example, block 1805 may involve completing operations similar to those of blocks 1655 through 1675, blocks 1655 through 1680 or blocks 1655 through 1685 for a first frequency band, for a first mobile device location, for a first virtual height speaker, for a first type of test signal, for a first top-firing or front-firing speaker, etc.

In this implementation, block 1840 involves determining whether the process of block 1835 is complete. If it is determined in block 1840 that the process of block 1835 is not complete, the process reverts back to block 1835 in this example. However, if it is determined in block 1840 that the process of block 1835 is complete, the process reverts back to block 1815 in this example, wherein it is determined whether there are additional stages of the speaker calibration process to complete.

If it is determined that there are no additional stages of the speaker calibration process, in this example the process reverts to block 1680 or block 1685 of method 1600. As noted above, in some implementations a stage may involve completing blocks similar to those of blocks 1655 through 1675. In such implementations, the process of computing power ratios may not yet have been performed. In other implementations, a stage may involve completing blocks similar to those of blocks 1655 through 1680. In such implementations, the process of computing power ratios may have been performed, but a compensating gain may not yet have been determined. However, in other implementations a stage may involve completing blocks similar to those of blocks 1655 through 1685. In such implementations, at least one compensating gain may have already been determined. For example, a frequency-dependent compensating gain may already have been determined for one frequency band, but not for all frequency bands.

Alternatively, a broadband compensating gain may already have been determined for a first location, but not for a second location and/or for other locations. Some implementations may involve determining a single broadband compensating gain based on multiple broadband compensating gains, each corresponding to a different mobile device location. In some such implementations, the single broadband compensating gain may be based on an average of the multiple broadband compensating gains. The average may, in some implementations, be a weighted average. For example, the average may be weighted based on the relative importance that a user assigns to different locations. A user may, for example, assign a higher importance to a location corresponding to his or her favorite chair, couch, etc., within a listening environment.

Figure 19:
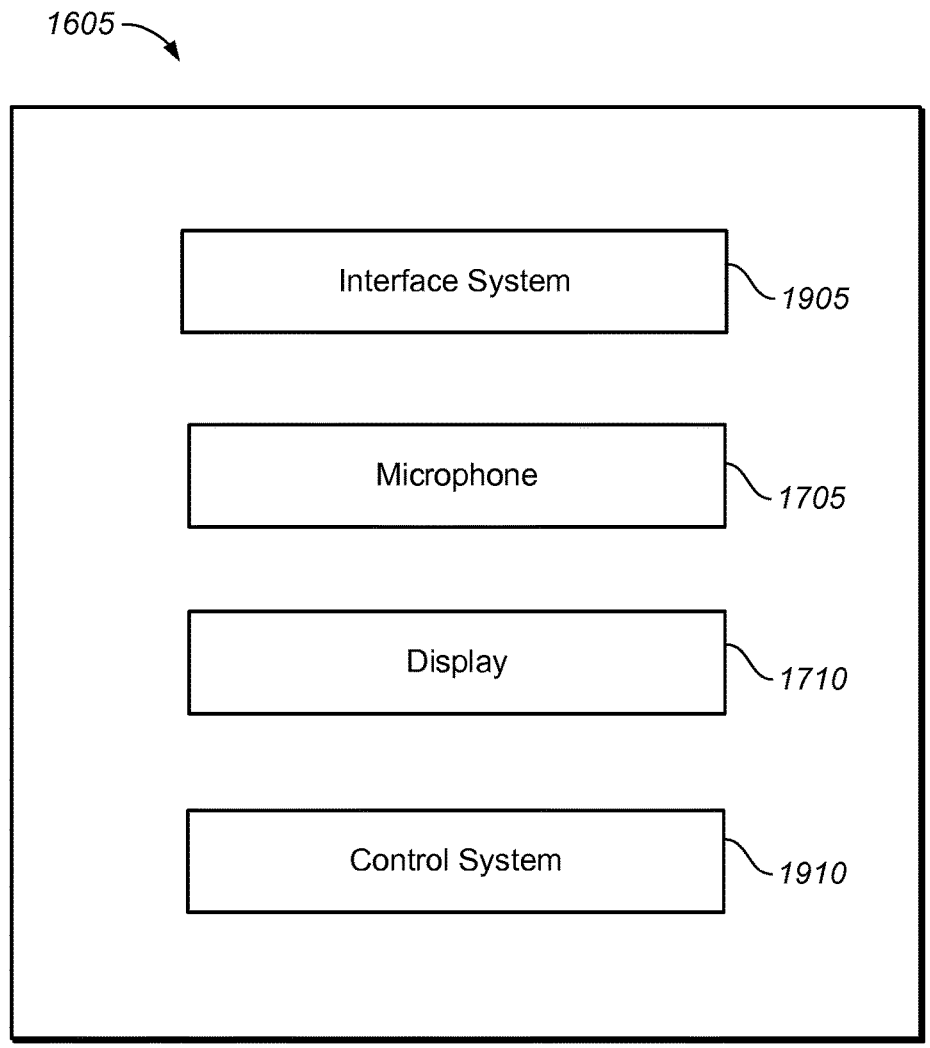
FIG. 19 is a block diagram that provides examples of components of a mobile device.

FIG. 19 is a block diagram that provides examples of components of a mobile device. In the implementation depicted in FIG. 19, the mobile device 1605 includes an interface system 1905, a microphone 1705, a display 1710 and a control system 1910. The interface system 1905 may include one or more user interfaces, ports, wireless interfaces, network interfaces, etc. The control system 1910 may include one or more processors, such as general purpose single- or multi-chip processors, digital signal processors, application specific integrated circuits, field programmable gate arrays or other programmable logic devices, discrete gate or transistor logic, discrete hardware components and/or combinations thereof.

The control system 1910 may be capable of providing audio processing functionality, including but not limited to the types of speaker calibration functionality described herein. For example, the control system 1910 may be capable of receiving, via the interface system 1905, an indication to initiate a speaker calibration process. The indication may, for example, be received via a user interface, such as a touch sensor system of the mobile device, etc. The control system 1910 may be capable of speech recognition and of controlling at least some operations of the mobile device 1605 according to such voice commands. Therefore, the indication to initiate a speaker calibration process may, in some implementations, be received by voice command via the microphone 1705. Alternatively, or additionally, the indication may be received via a wireless interface, e.g., via a signal from a component of an audio system.

The control system 1910 may be capable of determining a desired acoustic power ratio between a first top-firing speaker and a first front-firing speaker. In some implementations, determining the desired acoustic power ratio may involve receiving speaker product information via the interface system 1905, e.g., via a user interface or a wireless interface of the mobile device. Determining the desired acoustic power ratio also may involve obtaining, from a data structure stored in a memory, a product-specific desired acoustic power ratio corresponding to the speaker product information. In some implementations, the obtaining process may involve obtaining the product-specific desired acoustic power ratio from a memory of another device, via an interface of the interface system 1905 (e.g., via a wireless interface, a user interface or a port).

However, in alternative implementations, the obtaining process may involve obtaining the product-specific desired acoustic power ratio of a memory of the mobile device. The control system 1910 may include, or may be capable of communication with, one or more memory devices of a memory system (not shown in FIG. 19). The interface system 1905 may include at least one interface between the control system 1910 and the memory system. The memory system may include one or more suitable types of non-transitory storage media, such as flash memory, a hard drive, etc. In some such implementations, the control system 1910 may be configured to operate (at least in part) according to software stored on one or more non-transitory media of the memory system. The non-transitory media may include memory associated with the control system 1910, such as random access memory (RAM) and/or read-only memory (ROM).

The control system 1910 may be capable of providing a first user prompt indicating that a user should position a mobile device in a first location. For example, the control system 1910 may be capable of providing a first user prompt via the display 1710 and/or via a speaker.

The control system 1910 may be capable of sending, via a wireless interface, at least one signal indicating that the first top-firing speaker should reproduce top-firing speaker acoustic test signals and that the first front-firing speaker should reproduce front-firing speaker acoustic test signals. The control system 1910 may be capable of receiving, from the microphone 1705, first electrical signals corresponding to first measured acoustic power of reproduced top-firing speaker acoustic test signals and first measured acoustic power of reproduced front-firing speaker acoustic test signals.

The control system 1910 may be capable of computing, based on the electrical signals, a first measured acoustic power ratio. The first measured acoustic power ratio may correspond to a ratio of the first measured acoustic power of the reproduced top-firing speaker acoustic test signals to the first measured acoustic power of the reproduced front-firing speaker acoustic test signals. The control system 1910 may be capable of determining, based at least in part on the first measured acoustic power ratio, a compensating gain to be applied to the first top-firing speaker or the first front-firing speaker in order to produce the desired acoustic power ratio. The control system 1910 may be capable of sending, via the wireless interface, a compensating gain signal corresponding to the compensating gain.

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method, comprising:
  receiving an indication to initiate a speaker calibration process;
  determining a desired acoustic power ratio between a top-firing speaker and a front-firing speaker for enabling the top-firing speaker to simulate an overhead speaker;
  providing a first user prompt indicating that a user should position a mobile device in a first location;
  sending, via a wireless interface of the mobile device, at least one signal indicating that the top-firing speaker should reproduce top-firing speaker acoustic test signals and that the front-firing speaker should reproduce front-firing speaker acoustic test signals;
  receiving, from a microphone of the mobile device, first electrical signals corresponding to first measured acoustic power of reproduced top-firing speaker acoustic test signals and first measured acoustic power of reproduced front-firing speaker acoustic test signals, the first measured acoustic power of reproduced top-firing speaker acoustic test signals corresponding to sound reflected from a ceiling;
  computing, based on the electrical signals, a first measured acoustic power ratio, the first measured acoustic power ratio corresponding to a ratio of the first measured acoustic power of the reproduced top-firing speaker acoustic test signals to the first measured acoustic power of the reproduced front-firing speaker acoustic test signals; and
  determining, based at least in part on the first measured acoustic power ratio, a compensating gain to be applied to the top-firing speaker or the front-firing speaker in order to produce the desired acoustic power ratio.

2. The method of claim 1, further comprising sending, via the wireless interface of the mobile device, a compensating gain signal corresponding to the compensating gain.

3. The method of claim 1, wherein determining the desired acoustic power ratio involves:
  receiving speaker product information; and
  obtaining, from a data structure stored in a memory, a product-specific desired acoustic power ratio corresponding to the speaker product information.

4. The method of claim 1, further comprising receiving test signal differentiating information for differentiating the reproduced top-firing speaker acoustic test signals from the reproduced front-firing speaker acoustic test signals.

5. The method of claim 1, further comprising:
  determining that a first stage of the speaker calibration process has concluded; and
  providing a second user prompt indicating that the user should position the mobile device in a second location during a second stage of the speaker calibration process.

6. The method of claim 5, further comprising sending, via the wireless interface of the mobile device, at least one signal indicating that the first top-firing speaker should reproduce the top-firing speaker acoustic test signals and that the first front-firing speaker should reproduce the front-firing speaker acoustic test signals for the second stage of the speaker calibration process.

7. The method of claim 5, further comprising:
receiving, from the microphone of the mobile device, second electrical signals corresponding to second measured acoustic power of the reproduced top-firing speaker acoustic test signals and second measured acoustic power of the reproduced front-firing speaker acoustic test signals;
computing, based on the second electrical signals, a second measured acoustic power ratio, the second measured acoustic power ratio corresponding to a ratio of the second measured acoustic power of the reproduced top-firing speaker acoustic test signals to the second measured acoustic power of the reproduced front-firing speaker acoustic test signals; and
determining the compensating gain based, at least in part, on the first measured acoustic power ratio and the second measured acoustic power ratio.

8. The method of claim 1, wherein the compensating gain is a first frequency-dependent compensating gain for a first frequency band and wherein the first electrical signals correspond to first measured acoustic power of the first frequency band, further comprising:
receiving, from the microphone of the mobile device, second electrical signals corresponding to second measured acoustic power of the reproduced top-firing speaker acoustic test signals in a second frequency band and second measured acoustic power of the reproduced front-firing speaker acoustic test signals in the second frequency band;
computing, based on the electrical signals, a second measured acoustic power ratio, the second measured acoustic power ratio corresponding to a ratio of the second measured acoustic power of the reproduced top-firing speaker acoustic test signals to the second measured acoustic power of the reproduced front-firing speaker acoustic test signals; and
determining, based at least in part on the second measured acoustic power ratio, a second frequency-dependent compensating gain for the second frequency band.

9. A non-transitory medium having software stored thereon, the software including instructions for controlling a mobile device to do the following:
receive an indication to initiate a speaker calibration process;
determine a desired acoustic power ratio between a top-firing speaker and a front-firing speaker for enabling the top-firing speaker to simulate an overhead speaker;
provide a first user prompt indicating that a user should position a mobile device in a first location;
send, via a wireless interface of the mobile device, at least one signal indicating that a first top-firing speaker should reproduce top-firing speaker acoustic test signals and that a first front-firing speaker should reproduce front-firing speaker acoustic test signals;
receive, from a microphone of the mobile device, first electrical signals corresponding to first measured acoustic power of reproduced top-firing speaker acoustic test signals and first measured acoustic power of reproduced front-firing speaker acoustic test signals, the first measured acoustic power of reproduced top-firing speaker acoustic test signals corresponding to sound reflected from a ceiling;
compute, based on the electrical signals, a first measured acoustic power ratio, the first measured acoustic power ratio corresponding to a ratio of the first measured acoustic power of the reproduced top-firing speaker acoustic test signals to the first measured acoustic power of the reproduced front-firing speaker acoustic test signals; and
determine, based at least in part on the first measured acoustic power ratio, a compensating gain to be applied to the first top-firing speaker or the first front-firing speaker in order to produce the desired acoustic power ratio.

10. The non-transitory medium of claim 9, wherein the software includes instructions for controlling the mobile device to send, via the wireless interface, a compensating gain signal corresponding to the compensating gain.

11. The non-transitory medium of claim 9, wherein determining the desired acoustic power ratio involves:
receiving speaker product information; and
obtaining, from a data structure stored in a memory, a product-specific desired acoustic power ratio corresponding to the speaker product information.

12. The non-transitory medium of claim 9, further comprising receiving test signal differentiating information for differentiating the top-firing speaker acoustic test signals from the front-firing speaker acoustic test signals.

13. The non-transitory medium of claim 9, wherein the software includes instructions for controlling the mobile device to:
determine that a first stage of the speaker calibration process has concluded; and
provide a second user prompt indicating that the user should position the mobile device in a second location during a second stage of the speaker calibration process.

14. The non-transitory medium of claim 13, wherein the software includes instructions for controlling the mobile device to send, via the wireless interface of the mobile device, at least one signal indicating that the first top-firing speaker should reproduce the top-firing speaker acoustic test signals and that the first front-firing speaker should reproduce the front-firing speaker acoustic test signals during the second stage of the speaker calibration process.

15. The non-transitory medium of claim 13, wherein the software includes instructions for controlling the mobile device to:
receive, from the microphone of the mobile device, second electrical signals corresponding to second measured acoustic power of the reproduced top-firing speaker acoustic test signals and second measured acoustic power of the reproduced front-firing speaker acoustic test signals;
compute, based on the electrical signals, a second measured acoustic power ratio, the second measured acoustic power ratio corresponding to a ratio of the second measured acoustic power of the reproduced top-firing speaker acoustic test signals to the second measured acoustic power of the reproduced front-firing speaker acoustic test signals; and
determine the compensating gain based, at least in part, on the first measured acoustic power ratio and the second measured acoustic power ratio.

16. The non-transitory medium of claim 9, wherein the compensating gain is a first frequency-dependent compensating gain for a first frequency band and wherein the first electrical signals correspond to first measured acoustic power of the first frequency band, and wherein the software includes instructions for controlling the mobile device to:

receive, from the microphone of the mobile device, second electrical signals corresponding to second measured acoustic power of the reproduced top-firing speaker acoustic test signals in a second frequency band and second measured acoustic power of the reproduced front-firing speaker acoustic test signals in the second frequency band;

compute, based on the electrical signals, a second measured acoustic power ratio, the second measured acoustic power ratio corresponding to a ratio of the second measured acoustic power of the reproduced top-firing speaker acoustic test signals to the second measured acoustic power of the reproduced front-firing speaker acoustic test signals; and determine, based at least in part on the second measured acoustic power ratio, a second frequency-dependent compensating gain for the second frequency band.

17. The non-transitory medium of claim 9, wherein the software includes instructions for controlling the mobile device to:

determine that a first stage of the speaker calibration process has concluded;

send, via the wireless interface of the mobile device, at least one signal indicating that a second top-firing speaker should reproduce the top-firing speaker acoustic test signals and that a second front-firing speaker should reproduce the front-firing speaker acoustic test signals for a second stage of the speaker calibration process;

receive, from the microphone of the mobile device, second electrical signals corresponding to second measured acoustic power of the reproduced top-firing speaker acoustic test signals and second measured acoustic power of the reproduced front-firing speaker acoustic test signals;

compute, based on the electrical signals, a second measured acoustic power ratio, the second measured acoustic power ratio corresponding to a ratio of the second measured acoustic power of the reproduced top-firing speaker acoustic test signals to the second measured acoustic power of the reproduced front-firing speaker acoustic test signals; and determine, based at least in part on the second measured acoustic power ratio, a compensating gain to be applied to the second top-firing speaker or the second front-firing speaker in order to produce the desired acoustic power ratio.

18. An apparatus, comprising:
an interface system, including a wireless interface and at least one user interface;
a microphone;
a display; and
a control system capable of:

receiving, via the interface system, an indication to initiate a speaker calibration process;

determining a desired acoustic power ratio between a first top-firing speaker and a first front-firing speaker for enabling the top-firing speaker to simulate an overhead speaker;

providing, via the display, a first user prompt indicating that a user should position a mobile device in a first location;

sending, via the wireless interface, at least one signal indicating that the first top-firing speaker should reproduce top-firing speaker acoustic test signals and that the first front-firing speaker should reproduce front-firing speaker acoustic test signals;

receiving, from the microphone, first electrical signals corresponding to first measured acoustic power of reproduced top-firing speaker acoustic test signals and first measured acoustic power of reproduced front-firing speaker acoustic test signals, the first measured acoustic power of reproduced top-firing speaker acoustic test signals corresponding to sound reflected from a ceiling;

computing, based on the electrical signals, a first measured acoustic power ratio, the first measured acoustic power ratio corresponding to a ratio of the first measured acoustic power of the reproduced top-firing speaker acoustic test signals to the first measured acoustic power of the reproduced front-firing speaker acoustic test signals; and determining, based at least in part on the first measured acoustic power ratio, a compensating gain to be applied to the first top-firing speaker or the first front-firing speaker in order to produce the desired acoustic power ratio.

19. The apparatus of claim 18, wherein the control system is further capable of sending, via the wireless interface, a compensating gain signal corresponding to the compensating gain.

20. The apparatus of claim 18, wherein determining the desired acoustic power ratio involves:

receiving speaker product information; and obtaining, from a data structure stored in a memory, a product-specific desired acoustic power ratio corresponding to the speaker product information.

21. The apparatus of claim 18, wherein the control system is capable of receiving test signal differentiating information for differentiating the top-firing speaker acoustic test signals from the front-firing speaker acoustic test signals.

22. The apparatus of claim 18, wherein the control system is capable of:

determining that a first stage of the speaker calibration process has concluded; and providing a second user prompt indicating that the user should position the apparatus in a second location during a second stage of the speaker calibration process.

23. The apparatus of claim 18, wherein the control system comprises one or more of processors, such as general purpose single- or multi-chip processors, digital signal processors, application specific integrated circuits, field programmable gate arrays or other programmable logic devices, discrete gate or transistor logic, discrete hardware components, or combinations thereof.

24. The apparatus of claim 18, wherein the control system is capable of:

determining that a first stage of the speaker calibration process has concluded;

sending, via the wireless interface, at least one signal indicating that a second top-firing speaker should reproduce the top-firing speaker acoustic test signals and that a second front-firing speaker should reproduce the front-firing speaker acoustic test signals for a second stage of the speaker calibration process;

receiving, from the microphone, second electrical signals corresponding to second measured acoustic power of the reproduced top-firing speaker acoustic test signals and second measured acoustic power of the reproduced front-firing speaker acoustic test signals;

computing, based on the electrical signals, a second measured acoustic power ratio, the second measured acoustic power ratio corresponding to a ratio of the second measured acoustic power of the reproduced top-firing speaker acoustic test signals to the second measured acoustic power of the reproduced front-firing speaker acoustic test signals; and determine, based at least in part on the first measured acoustic power ratio, a compensating gain to be applied to the second top-firing speaker or the second front-firing speaker in order to produce the desired acoustic power ratio.

* * * * *